US008702517B2

(12) United States Patent
Walker et al.

(10) Patent No.: US 8,702,517 B2
(45) Date of Patent: Apr. 22, 2014

(54) GAMING DEVICE METHODS AND APPARATUS EMPLOYING AUDIO/VIDEO PROGRAMMING OUTCOME PRESENTATION

(75) Inventors: Jay S. Walker, Ridgefield, CT (US); James A. Jorasch, New York, NY (US); Robert C. Tedesco, Fairfield, CT (US); Geoffrey M. Gelman, Brooklyn, NY (US); Stephen C. Tulley, Monroe, CT (US); David F. Zucker, Winnetka, IL (US); Taylor M. Davenport, Stamford, CT (US)

(73) Assignee: IGT, Las Vegas, NV (US)

( * ) Notice: Subject to any disclaimer, the term of this patent is extended or adjusted under 35 U.S.C. 154(b) by 1688 days.

(21) Appl. No.: 11/465,632

(22) Filed: Aug. 18, 2006

(65) Prior Publication Data

US 2007/0105625 A1 May 10, 2007

Related U.S. Application Data

(63) Continuation-in-part of application No. 10/136,050, filed on Apr. 30, 2002, now abandoned.

(60) Provisional application No. 60/373,111, filed on Apr. 16, 2002.

(51) Int. Cl.

| | |
|---|---|
| ***A63F 9/24*** | (2006.01) |
| ***G06F 13/00*** | (2006.01) |
| *G06F 3/00* | (2006.01) |

(52) U.S. Cl.

USPC .................. 463/41; 463/16; 463/39; 463/40; 463/42; 725/32; 725/42; 273/142 K

(58) Field of Classification Search

USPC .......... 463/20, 39, 40, 16, 41, 42; 273/142 K; 725/32, 42

See application file for complete search history.

(56) References Cited

U.S. PATENT DOCUMENTS

| | | | | |
|---|---|---|---|---|
| 4,621,814 | A | 11/1986 | Stepan et al. | 273/138 A |
| 5,259,613 | A | 11/1993 | Marnell, II | 273/138 A |
| 5,823,872 | A | 10/1998 | Prather et al. | 463/6 |
| 5,997,400 | A | 12/1999 | Seelig et al. | 463/6 |
| 6,004,211 | A * | 12/1999 | Brenner et al. | 463/40 |
| 6,089,981 | A * | 7/2000 | Brenner et al. | 463/40 |
| 6,095,921 | A | 8/2000 | Walker et al. | 463/20 |

(Continued)

OTHER PUBLICATIONS

Beyer, Andrew, "Tracks Without Horses; Teletrack Has Drawbacks; Opening Day At Teletrack", The Washington Post, Oct. 25, 1979, Section: Sports, F1, 3 pages.

(Continued)

*Primary Examiner* — Masud Ahmed
*Assistant Examiner* — Frank M Leiva
(74) *Attorney, Agent, or Firm* — Neal, Gerber & Eisenberg LLP

(57) ABSTRACT

In a first aspect, a method of operating a gaming device is provided. The method includes the steps of (1) determining an outcome value of a game result of the gaming device; (2) retrieving historical audio/video programming having content that provides an indication of the outcome value; and (3) providing the historical audio/video programming to a player of the gaming device. The historical audio/video programming may comprise, for example, a television show, a sporting event, a movie, an animated show, or the like. Numerous other aspects are provided.

24 Claims, 13 Drawing Sheets

(56) References Cited

U.S. PATENT DOCUMENTS

| | | | | |
|---|---|---|---|---|
| 6,099,409 | A * | 8/2000 | Brenner et al. | 463/40 |
| 6,113,495 | A | 9/2000 | Walker et al. | 463/42 |
| 6,135,885 | A | 10/2000 | Lermusiaux | 463/20 |
| 6,186,893 | B1 | 2/2001 | Walker et al. | 463/20 |
| 6,190,256 | B1 | 2/2001 | Walker et al. | 463/25 |
| 6,210,275 | B1 | 4/2001 | Olsen | 463/16 |
| 6,234,896 | B1 | 5/2001 | Walker et al. | 463/16 |
| 6,302,790 | B1 | 10/2001 | Brossard | 463/20 |
| 6,319,123 | B1 | 11/2001 | Paludi | 463/20 |
| 6,375,568 | B1 | 4/2002 | Roffman et al. | 463/26 |
| 6,375,570 | B1 | 4/2002 | Poole | 463/31 |
| 6,390,917 | B1 | 5/2002 | Walker et al. | 463/20 |
| 6,406,369 | B1 | 6/2002 | Baerlocher et al. | 463/20 |
| 6,500,068 | B2 | 12/2002 | Walker et al. | 463/25 |
| 6,592,457 | B1 * | 7/2003 | Frohm et al. | 463/16 |
| 6,656,046 | B1 * | 12/2003 | Yoseloff et al. | 463/20 |
| 6,786,824 | B2 | 9/2004 | Cannon | 463/42 |
| 6,846,238 | B2 * | 1/2005 | Wells | 463/39 |
| 6,942,574 | B1 * | 9/2005 | LeMay et al. | 463/41 |
| 7,470,186 | B2 | 12/2008 | Cannon | |
| 2002/0042918 | A1 * | 4/2002 | Townsend et al. | 725/41 |
| 2002/0132658 | A1 * | 9/2002 | Brown et al. | 463/16 |
| 2002/0149590 | A1 * | 10/2002 | Townsend | 345/473 |
| 2002/0183106 | A1 * | 12/2002 | Cole | 463/16 |
| 2003/0013527 | A1 * | 1/2003 | Rowe et al. | 463/42 |
| 2003/0054868 | A1 * | 3/2003 | Paulsen et al. | 463/1 |
| 2003/0079224 | A1 * | 4/2003 | Komar et al. | 725/32 |
| 2006/0217179 | A1 | 9/2006 | Walker et al. | |

OTHER PUBLICATIONS

Milbert, Neil, “Win , Place, Showtime Teletrack Theatre is a Hit in Connecticut”, Chicago Tribune, Jun. 26, 1987, Section: Sports, p. 1, Zone: C, 4 pages.

“Strategy Analytics: Enhanced TV and Interactive Games to Dominate $1.8. Billion Interactive TV Market; 72 Million Europeans Have Access to Interactive TV”, Business Wire, Sep. 10, 2002, 2pages.

* cited by examiner

210'

402a-n

| RANDOM NUMBER 404 | AUDIO/VIDEO OUTPUT 406 | GAME RESULT 408 | OUTCOME VALUE 410 |
|---|---|---|---|
| 00001 | [HOLE_IN_ONE.MPG2] | WIN | 100 |
| 00002 | [MISSED_PUTT_1.MPG2] | LOSS | 0 |
| 00003 | [CHIP_FOR_BIRDIE.MPG] | WIN | 2 |
| 00004 | [ERRANT_SHOT_1.MPG] | LOSS | 0 |
| 00005 | [WATER_HAZARD_2.MPG] | LOSS | 0 |
| 00006 | [SAND_SAVE_1.MPG] | WIN | 2 |
| ⋮ | ⋮ | ⋮ | ⋮ |
| 00112 | [GREG_AMY_WEDDING.MOV] | WIN | 50 |
| 00113 | [STRANGER_AT_DOOR.MOV] | LOSS | 0 |
| 00114 | [DOCTOR_HAS_GOOD_NEWS.MOV] | WIN | 2 |
| 00115 | [BREAKFAST_ALONE.MOV] | LOSS | 0 |
| 00116 | [BREAK_UP_1.MOV] | LOSS | 0 |
| 00117 | [FIRST_KISS_1.MOV] | WIN | 14 |
| ⋮ | ⋮ | ⋮ | ⋮ |
| 03456 | [NYY_GAMEWINNING_HOMER_1.MPG] | WIN | 20 |
| 03457 | [NYY_6_4_3_DBLPLAY_7.MPG] | WIN | 2 |
| 03458 | [NYY_THROWING_ERROR_1.MPG] | LOSS | 0 |
| 03459 | [NYY_POPUP_TO_RIGHT_10.MPG] | LOSS | 0 |
| ⋮ | ⋮ | ⋮ | ⋮ |
| 10647 | [10TH_FRAME_PERFECT_GAME.MPG] | WIN | 20 |
| 10648 | [7_10_SPLIT_SPARE_1.MPG] | WIN | 10 |

FIG. 4A

210"

| | RANDOM NUMBER RANGE 430 | GAME RESULT 432 | OUTCOME VALUE 434 | AUDIO/VIDEO OUTPUT 1 436a | A/V OUTPUT 1 AVAILABLE? 438a | ... | AUDIO/VIDEO OUTPUT N 436n | A/V OUTPUT N AVAILABLE? 438n |
|---|---|---|---|---|---|---|---|---|
| 412 | 1 - 8570 | LOSS | 0 | [FOUL_BALL1.MPG2] | NO | | [GROUND_TO_3RD.MPG2] | YES |
| 414 | 8571 - 9930 | WIN | 2 | [BASE_HIT1.MPG2] | NO | | [BASE_HIT890.MPG2] | YES |
| 416 | 9931 - 10398 | WIN | 5 | [STOLEN_BASE1.MPG2] | NO | | [DOUBLE_PLAY55.AVI] | YES |
| 418 | 10399 - 10404 | WIN | 10 | [DOUBLE_STEAL.MPG2] | YES | | [DOUBLE_58.MPG2] | YES |
| 420 | 10405 - 10429 | WIN | 14 | [2RBI_DOUBLE1.AVI] | NO | ... | [RBI_TRIPLE26.AVI] | YES |
| 422 | 10430 - 10453 | WIN | 18 | [TRIPLE1.MPG2] | YES | | [TRIPLE20.MPG2] | YES |
| 424 | 10454 - 10627 | WIN | 20 | [3RBI_DOUBLE1.AVI] | NO | | [2_RUN_HOMER.AVI] | YES |
| 426 | 10628 - 10647 | WIN | 50 | [3_RUN_HOMER1.MPG2] | YES | | [TRIPLE_PLAY3.MPG2] | YES |
| 428 | 10648 | WIN | 100 | [GRAND_SLAM1.AVI] | YES | ... | [LAST_PITCH_PFCT_GM4.AVI] | YES |

FIG. 4B

212

| | RANDOM NUMBER RANGE 520 | OUTCOME VALUE 522 | EXPECTED HITS PER CYCLE 524 |
|---|---|---|---|
| 502 | 1 - 8570 | 0 | 8570 |
| 504 | 8571 - 9930 | 2 | 1360 |
| 506 | 9931 - 10398 | 5 | 468 |
| 508 | 10399 - 10446 | 10 | 48 |
| 510 | 10447 - 10471 | 14 | 25 |
| 512 | 10472 - 10495 | 18 | 24 |
| 514 | 10496 - 10627 | 20 | 132 |
| 516 | 10628 - 10647 | 50 | 20 |
| 518 | 10648 | 100 | 1 |

FIG. 5

214

| | PLAYER IDENTIFIER 812 | GAMING DEVICE IDENTIFIER 814 | SESSION START DATE/TIME 816 | NUMBER OF HANDLE PULLS 818 | OUTPUT AUDIO/VIDEO 1 820a | ... | OUTPUT AUDIO/VIDEO N 820n |
|---|---|---|---|---|---|---|---|
| 802 | P 161 | M 601 | 01/01/05 13:55 | 86 | [DESCRIPTOR 1] | | [DESCRIPTOR N] |
| 804 | P 802 | M 176 | 01/01/05 14:08 | 73 | [DESCRIPTOR A] | | [DESCRIPTOR B] |
| 806 | P 693 | M 738 | 01/01/05 14:16 | 65 | [DESCRIPTOR X] | ... | [DESCRIPTOR Y] |
| 808 | P 864 | M 389 | 01/01/05 14:22 | 59 | [DESCRIPTOR S] | | [DESCRIPTOR T] |
| 810 | P 895 | M 529 | 01/01/05 14:31 | 51 | [DESCRIPTOR L] | ... | [DESCRIPTOR M] |

FIG. 8

GAMING DEVICE METHODS AND APPARATUS EMPLOYING AUDIO/VIDEO PROGRAMMING OUTCOME PRESENTATION

The present application is a continuation-in-part application of U.S. patent Ser. No. 10/136,050, filed Apr. 30, 2002 now abandoned, which claimed priority from U.S. Provisional Patent Application Ser. No. 60/373,111, filed Apr. 16, 2002 and titled "Gaming Device Methods and Apparatus Employing Audio/Video Clip Outcome Presentation". Both applications are hereby incorporated by reference herein in their entireties.

BACKGROUND OF THE INVENTION

Within the casino gaming industry, slot machines typically generate most of the profits realized by casino owners and operators. For this reason, numerous slot machine types and formats have been developed and are employed within casinos (e.g., slot machines having a variety of display formats for the reels or other game features of the slot machines, larger jackpots, etc.). By providing a large variety of slot machines, casino owners and operators may appeal to a larger audience, and acquire and retain slot machine players.

Despite the variety of available options, conventional slot machines may still lack sufficient entertainment value to attract and retain slot machine players. Specifically, many people view all or a portion of slot machine play primarily as a passive, relatively boring experience. Accordingly, a need exists for improved slot machines that provide a more interactive and/or exciting gaming experience.

SUMMARY OF THE INVENTION

Embodiments of the present invention allow pre-existing audio/visual programming to be repurposed from its original intent to a gaming environment such that the audio/visual programming is presented to players in place of more traditional outcome displays. That is, instead of watching reels resolve such that images on the reels are displayed along a payline so that the player can reference the displayed images to a paytable to determine whether and how much of a benefit is awarded, the audio/visual programming inferentially informs the player of the outcome by associating audio/visual programming of greater importance with higher benefit outcomes and associating audio/visual programming of lesser importance with low value or non-winning outcomes.

Further embodiments of the present invention relate to a particular gaming device layout in which the layout readily facilitates tying clip playback length to wagering amounts. Still further embodiments relate to how preliminary, non-outcome determinative portions of the audio/visual programming clips are presented to the player in a rapid, moving manner so that the player is teased into a suspenseful state trying to figure out which clip is going to be played. Still other embodiments allow the player to choose from between a plurality of audio/visual programming clips. The choice may or may not (depending on embodiment) affect the benefit awarded to the player.

BRIEF DESCRIPTION OF THE DRAWINGS

FIG. 4A illustrates a sample of the contents of a first exemplary outcome database of FIG. 2 or 3.

FIG. 4B illustrates a sample of the contents of a second exemplary outcome database of FIG. 2 or 3.

FIG. 5 illustrates a sample of the contents of a probability database of FIG. 2 or 3.

FIG. 8 illustrates a sample of the contents of the session status database of the controller of FIG. 2.

DETAILED DESCRIPTION

Figure 1:
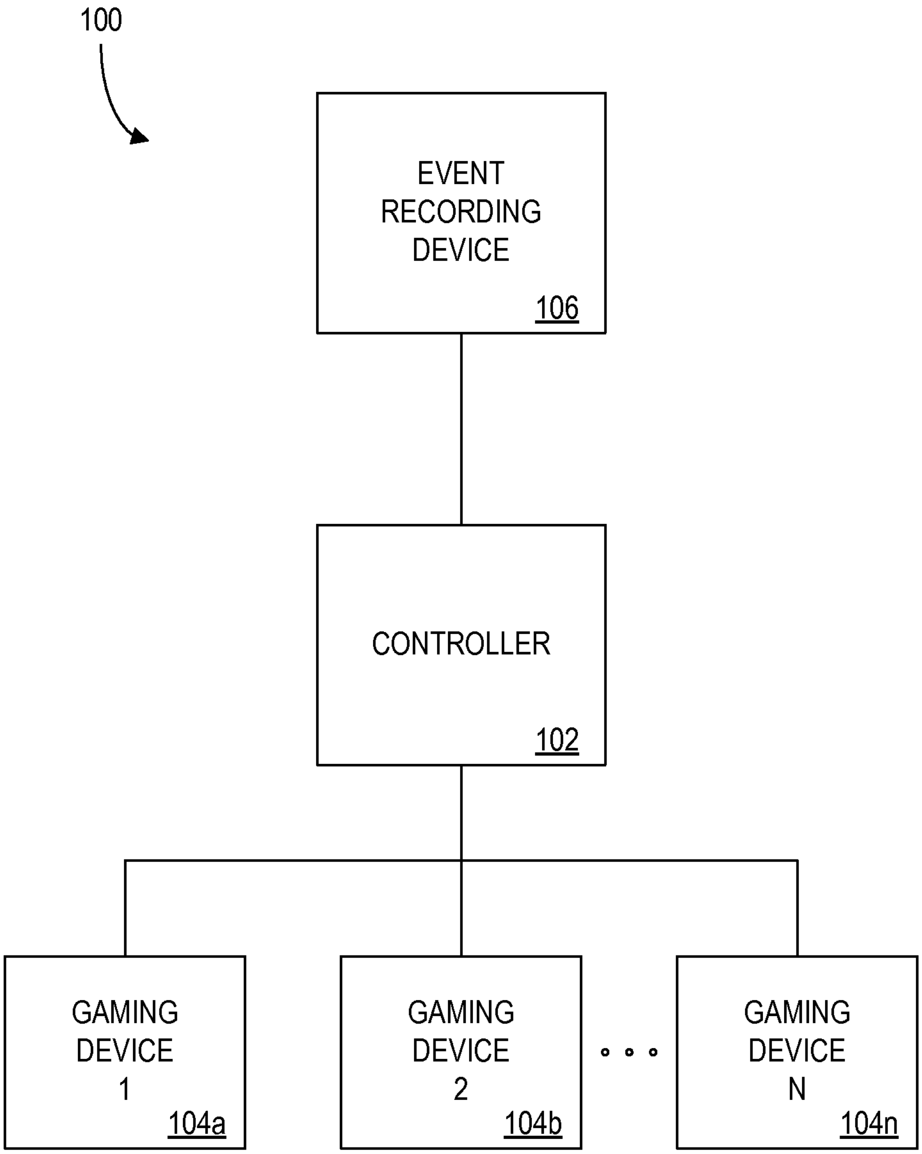
FIG. 1 is a schematic diagram of an exemplary gaming device control system provided in accordance with the present invention.

In one or more embodiments of the invention, historical audio/video programming may be provided to a player of a gaming device. More specifically, historical audio/video programming may be provided to the player during game play so as to indicate an outcome value the player will receive as a result of the game play. For example, in one embodiment of the invention, a player may provide a wager and subsequently pull a handle or actuate a button of a gaming device to initiate game play at the gaming device. Thereafter, the gaming device may determine a game result for the game play (e.g., win or lose) and an accompanying outcome value for the game play (e.g., no payment, a large payment, a nominal payment, etc.). In place of a conventional (e.g. reel-based) display that indicates an outcome value of the game play, the present invention may retrieve historical audio/video programming that provides an indication of the outcome value, and provide the historical audio/video programming to the player.

The historical audio/video programming may comprise, for example, an audio/video clip, a scene from a television show movie, or animated show (e.g., a cartoon or animated motion picture), a concert performance, a sporting event, etc., having a quality of performance, a level of achievement and/or a historical significance that is commensurate with, proportionate to or otherwise indicative of the outcome value of the game result. For instance, audio/video programming that depicts a kick-off return during a football game may be employed to indicate an outcome value of a game result of a gaming device. If a player of a gaming device achieves a jackpot as an outcome value of game play, a gaming device may provide historical audio/video programming depicting e.g. a 105-yard kick-off return for a touchdown. Likewise, if the player achieves a no payment outcome value, the gaming device may provide historical audio/video programming depicting a fair catch, a fumble, a touchback, etc. An intermediate distance kick-off return may indicate an intermediate outcome value. In other words, based on the significance or importance of the action in the programming, the player may infer the outcome value for the wager placed by the player. In each case, an increased level of player excitement and anticipation may be generated while the gaming device player watches a kick-off and attempted kick-off return during game play.

Other historical audio/video programming may be similarly employed (e.g., sporting events, acting performances, etc.), as described further below. Such historical audio/video programming presentation may occur before, during or after the game result and/or outcome value of game play is provided (or otherwise indicated) to a gaming device player.

By providing historical audio/video programming to a player of a gaming device so as to indicate an outcome value of a game result of the gaming device, numerous advantages are realized. When contrasted with conventional game play, such a gaming experience tends to be more exciting, interactive, and in some cases more spontaneous. For example, in one or more embodiments of the invention, a player may be unaware of the outcome value and/or game result of game play while the historical audio/video programming is being provided. However, by viewing the historical audio/video programming to obtain an indication of the outcome value and/or game result, a high level of excitement may result (e.g., as the player watches to see how far a kick-off is returned, whether a golfer makes a putt, whether a baseball player hits a home run or strikes out, whether an actress in a soap opera accepts or rejects a marriage proposal, etc.). Further, in one or more embodiments of the invention, a player of a gaming device may specify a classification of audio/video programming that will be employed to provide indications of outcome values during game play (e.g., audio/video programming that relates to a particular sporting event or type of sporting event, team, athlete, actor or actress, etc.). For example, a gaming device player may elect to have outcome values and/or game results conveyed to him in the form of sporting highlights from a particular team from a particular era (e.g. 1940's New York Yankees highlights). Game play thereby may be more personalized and/or satisfying. Accordingly, gaming devices that operate in accordance with the present invention may increase player satisfaction, attract a larger pool of gaming device players and increase the amount of time and/or money people are willing to spend at a gaming device. Casino profitability may thereby increase.

Relevant Terminology

As used herein, a "gaming device" refers to a device operative to: accept monetary wagers as consideration for the presentation of a game result, the presentation of the game result being in the form of historical audio and/or video programming; determine a random number, game result and/or outcome value; based on the determined random number, game result and/or outcome value, present historical audio and/or video programming to a gaming device player, wherein the presented audio and/or video programming is indicative of the determined random number, outcome value and/or game result; and provide a monetary award to the gaming device player if the game result is a winning game result.

As used herein, "historical audio/video programming" refers to audio and/or video programming that has been repurposed from its original purpose for use in a gaming environment. For example, exemplary historical audio/visual programming includes, but is not limited to a scene from a television show movie, or animated show (e.g., a cartoon or animated motion picture), one or more play(s) from a sporting event (e.g. a professional golfer executing a shot), etc. Historical audio/video programming may be pre-recorded audio/video programming and may convey to a gaming device player one or more of: a level of achievement or historical significance associated with the historical audio/video programming. As used herein, historical audio/video programming does not include the presentation of discreet slot machine reel positions, symbols or paylines, representations of playing cards, roulette wheels or keno elements. Rather, it is a distinct feature of the present invention that a gaming device outcome value may be conveyed to a gaming device player via the utilization of historical audio/video such as audio/video conveying one or more elements of e.g. a human performance (e.g. an athlete executing a play, an actor or actress reciting a line, performing within a certain context, portraying a particular type of scene or character etc.). Further, in accordance with the present invention, historical audio/video programming to be presented to a gaming device player may be determined via an independent and random process and not on the basis of a traditional reel-based gaming device outcome.

Exemplary Embodiments of Gaming Device Control System

FIG. 1 is a schematic diagram of an exemplary gaming device control system 100 provided in accordance with the present invention. The gaming device control system 100 includes a controller 102 in communication with a plurality of gaming devices 104*a-n* and an event recording device 106. Although three gaming devices 104*a-n* are shown in FIG. 1, it will be understood that fewer or more than three gaming devices may be in communication with the controller 102. Further, the controller 102 may comprise one or more controllers, and more than one event recording device 106 may be employed. Exemplary embodiments of the controller 102 are described below with reference to FIG. 2. Exemplary embodiments of the gaming devices 104*a-n* are described below with reference to FIG. 3.

The gaming devices 104*a-n* may be in communication with the controller 102 via any conventional communications medium and/or protocol. For example, the gaming devices 104*a-n* may communicate with the controller 102 via a WEB-based connection, a local area network (LAN), a wide area network (WAN), the Internet, other forms of internet protocol (IP) networks (e.g., intranets or extranets), a publicly switched telephone network (PSTN), a wireless communications network or any other known communications system/medium. Those skilled in the art will understand that devices in communication with each other need only be "capable of" communicating with each other and need not be continually transmitting data to or receiving data from each other. On the contrary, such devices need only transmit data to or receive data from each other as necessary, and may actually refrain from exchanging data most of the time. For example, a device in communication with another device via the Internet may not transmit data to the other device or receive data from the other device for weeks at a time. Further, devices may be in communication even though steps may be required to establish a communication link (e.g., dialing a network service provider).

The event recording device 106 may comprise, for example, a television camera or camcorder, a video cassette recorder (VCR), a Digital Versatile Disk (or Digital Video Disk) (DVD) recorder, a television recorder having data storage capability (e.g., TiVo® manufactured by Phillips™), a personal computer, a combination thereof, or any similar device capable of recording audio/video programming and/or providing audio/video programming to the controller 102. As with the gaming devices 104*a-n*, the event recording device 106 may be in communication with the controller 102 via any conventional communications medium and/or protocol (as described above).

As will be described further below, in one or more embodiments of the invention, the controller 102 may be adapted to receive historical audio/video programming (e.g., from a casino owner or operator or other controller operator, the player of a gaming device, etc., such as via the event recording device 106 or some other source), and provide the historical audio/video programming to one or more of the gaming devices 104*a-n*. The historical audio/video programming then may be employed by the one or more gaming devices 104*a-n* during game play to indicate an outcome value of a game result of the game play. For example, the historical audio/video programming may comprise, a television show, a movie, an animated show (e.g., a cartoon or animated motion picture), a concert performance, a sporting event, etc., having a quality of performance, a level of achievement and/or a historical significance that is commensurate with, proportionate to or otherwise indicative of the outcome value of the game result of the game play. In certain embodiments, the historical audio/video programming may be stored by one or more of the gaming devices 104*a-n* or provided directly to a gaming device player.

In other embodiments of the invention, all or a portion of the functions performed by the controller 102 may be performed by the gaming devices 104*a-n*. For example, each gaming device 104*a-n* may store historical audio/video programming locally (e.g., at the gaming device 104*a-n*), and/or receive historical audio/video programming directly from the event recording device 106. In one particular embodiment, all or a part of historical audio/video programming may be stored in a local memory of a gaming device (e.g., in a suitable format such as MPEG2 as described below). Such audio/video programming may be provided, for example, from an optical or magnetic storage media and periodically updated/loaded as required.

Whether stored locally or provided from a remote location, each gaming device 104*a-n* may be adapted to output historical audio/video programming to a player of the respective gaming device 104*a-n* so as to indicate an outcome value of a game result of game play at the respective gaming device 104*a-n*.

Exemplary Embodiments of the Controller

Figure 2:
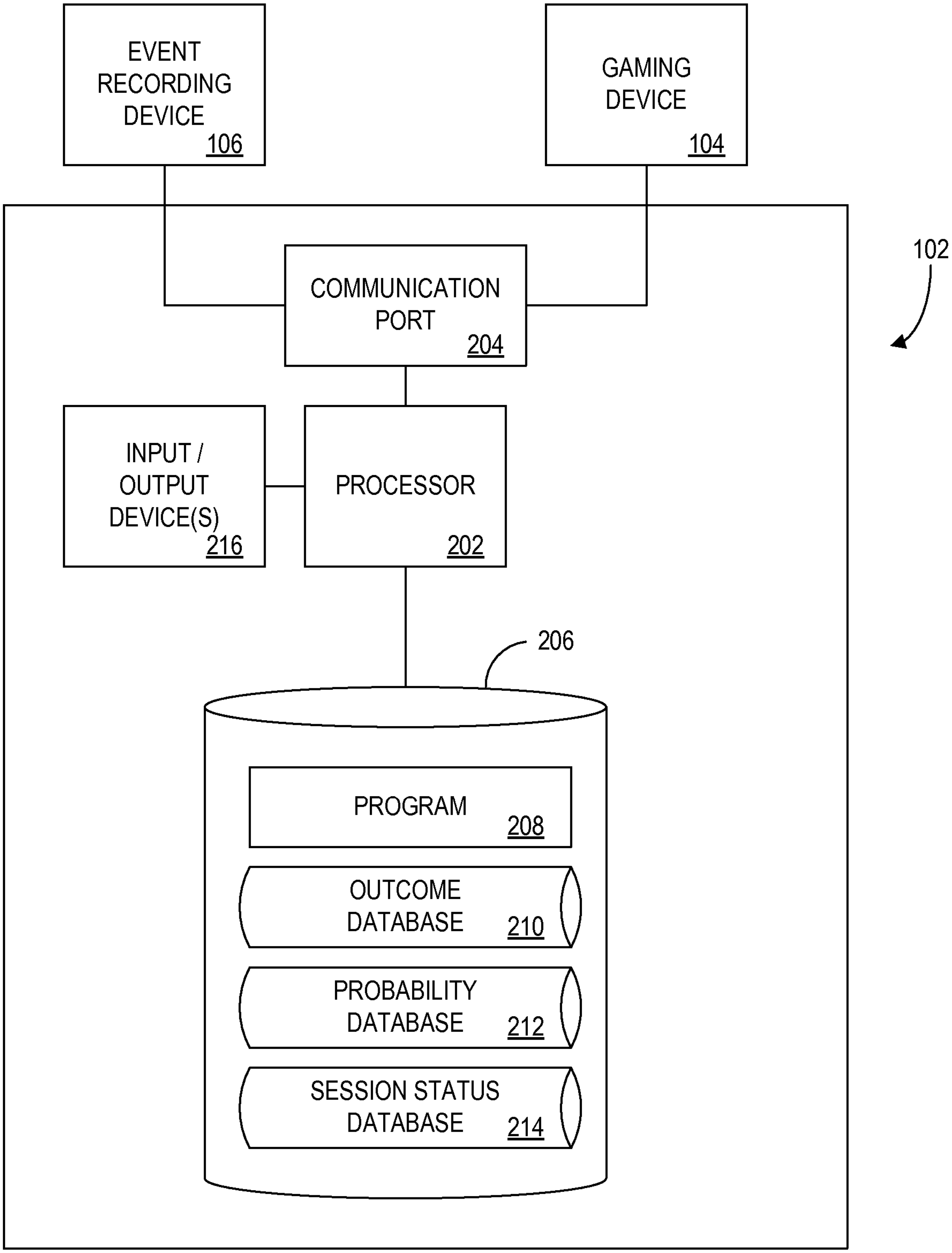
FIG. 2 is a schematic diagram of an exemplary embodiment of a controller of FIG. 1.

FIG. 2 is a schematic diagram of an exemplary embodiment of the controller 102 of FIG. 1 (shown coupled to one of the gaming devices 104*a-n*, referred to as gaming device 104 in FIG. 2, and the event recording device 106). The controller 102 may be implemented as a system controller, as a dedicated hardware circuit, as an appropriately programmed general purpose computer, or as any other equivalent electronic, mechanical or electromechanical device.

With reference to FIG. 2, the controller 102 comprises a processor 202, such as one or more conventional microprocessors (e.g., one or more Intel® Pentium® processors). The processor 202 is in communication with a communication port 204 through which the processor 202 communicates with other devices (e.g., with the gaming devices 104*a-n*, the event recording device 106 or other gaming devices or event recording devices not shown). The communication port 204 may include multiple communication channels for simultaneous communication with, for example, the gaming devices 104*a-n*, the event recording device 106 and/or other gaming or event recording devices (not shown). As stated, devices in communication with each other need not be continually transmitting to each other. On the contrary, such devices need only transmit to each other as necessary, may actually refrain from exchanging data most of the time, and may require several steps to be performed to establish a communication link between the devices.

The processor 202 also is in communication with a data storage device 206. The data storage device 206 may comprise an appropriate combination of magnetic, optical and/or semiconductor memory, and may include, for example, Random Access Memory (RAM), Read-Only Memory (ROM), a compact disc and/or a hard disk. The processor 202 and the data storage device 206 each may be, for example, located entirely within a single computer or other computing device; or connected to each other by a communication medium, such as a serial port cable, a telephone line or a radio frequency transceiver. Alternatively, the controller 102 may comprise one or more computers that are connected to a remote server computer (not shown) for maintaining databases.

The data storage device 206 may store, for example, (i) a program 208 (e.g., computer program code and/or a computer program product) adapted to direct the processor 202 in accordance with the present invention, and particularly in accordance with the processes described in detail hereinafter with regard to the controller 102; (ii) an outcome database 210 adapted to store information that may be utilized to determine a game result (e.g., win/lose, pay 5 credits, etc.), an associated outcome value and/or associated audio/video programming for one or more of the gaming devices 104*a-n*; (iii) a probability database 212 adapted to store information that may be utilized to establish frequencies with which various outcome values will occur at one or more of the gaming devices 104*a-n*; and (iv) a session status database 214 adapted to store information that may be employed to determine whether certain historical audio/video programming may be provided to a player of a gaming device 104*a-n* during game play at the gaming device 104*a-n*. Exemplary embodiments of the databases 210-214 are described below with reference to FIGS. 4A-5 and FIG. 8.

The program 208 may be stored, for example, in a compressed, an uncompiled and/or an encrypted format, and may include computer program code that allows the controller 102 to employ the communication port 204 to:

1. determine an outcome value of a game result at one of the gaming devices 104*a-n* (e.g., by receiving a random number from one of the gaming devices 104*a-n* and determining the outcome value based on the random number, by receiving the outcome value directly from one of the gaming devices, etc.);
2. retrieve historical audio/video programming having content that provides an indication of the outcome value of the game result; and/or
3. provide the historical audio/video programming to a player of the gaming device (e.g., by providing the historical audio/video programming to one of the gaming devices 104*a-n* or directly to the player).

Suitable computer program code may be provided for performing numerous other functions such as receiving historical audio/video programming, analyzing content of historical audio/video programming, determining an outcome value of a game result of a gaming device that is indicatable by the content of the audio/video programming, storing the outcome value such that the outcome value is correlated to at least a pointer to the historical audio/video programming, receiving payment in exchange for game play and/or the provision of historical audio/video programming, providing a payout if a player wins, receiving a selection of a classification of historical audio/video programming from a player of one of the gaming devices 104*a-n*, providing historical audio/video programming that is included within the selected classification to the player, etc. The computer program code required to implement the above functions (and the other functions described herein) can be developed by a person of ordinary skill in the art, and is not described in detail herein.

The controller 102 may include any peripheral devices (e.g., microphones, speakers, a keyboard, a computer display, a touch screen, voice recognition software, an optical or magnetic read head, etc., generally represented by input/output devices 216 in FIG. 2) required to implement the above functionality. The program 208 also may include program elements such as an operating system, a database management system and "device drivers" that allow the processor 202 to interface with computer peripheral devices (e.g., a video display, a keyboard, a computer mouse, etc.).

Note that instructions of the program 208 may be read into a main memory (not shown) of the processor 202 from a computer-readable medium other than the data storage device 206, such as from a ROM or from a RAM. While execution of sequences of instructions in the program 208 causes the processor 202 to perform the process steps described herein, hard-wired circuitry may be used in place of, or in combination with, software instructions for implementation of the processes of the present invention. Thus, embodiments of the present invention are not limited to any specific combination of hardware and software.

The processor 202 also may be in communication with a clock (not shown) that supplies time and date information to the processor 202 and that may comprise, for example, a clock internal to the processor 202, a clock external to the processor 202 or a clock embodied within the program 208 (e.g., based on a system clock not shown).

Exemplary Embodiments of the Gaming Devices

Figure 3:
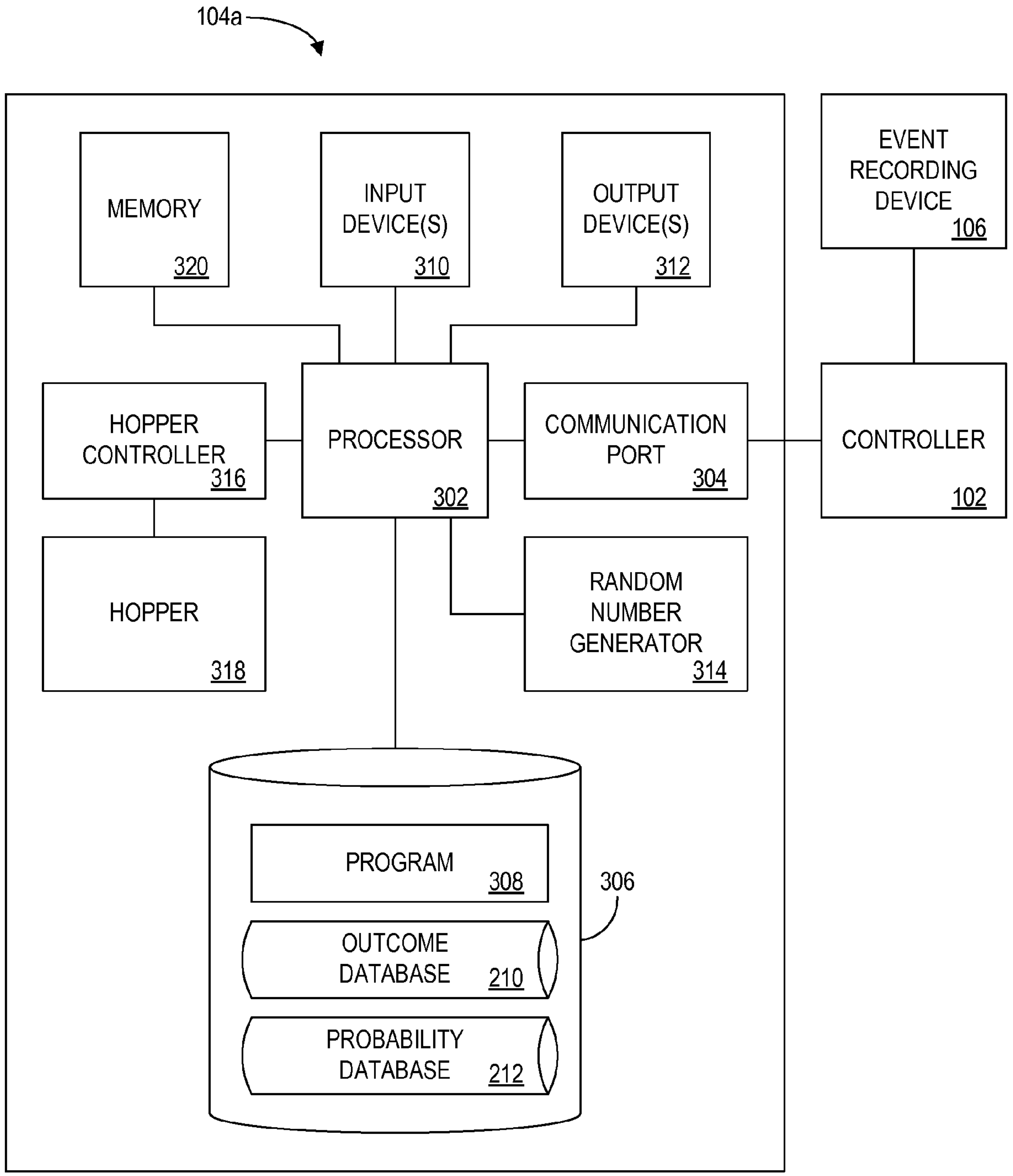
FIG. 3 is a schematic diagram of an exemplary embodiment of a gaming device of FIG. 1.

FIG. 3 is a schematic diagram of an exemplary embodiment of the gaming device 104*a* of FIG. 1 (shown coupled to the controller 102, which is in turn shown coupled to the event recording device 106). The gaming devices 104*b-n* may be similarly configured. As stated, each gaming device 104*a-n* may comprise a device operative to: accept monetary wagers as consideration for the presentation of a game result, the presentation of the game result being in the form of historical audio and/or video programming; determine a random number, game result and/or outcome value; based on the determined random number, game result and/or outcome value, present historical audio and/or video programming to a gaming device player, wherein the presented audio and/or video programming is indicative of the determined random number, outcome value and/or game result; and provide a monetary award to the gaming device player if the game result is a winning game result.

With reference to FIG. 3, the gaming device 104*a* comprises a processor 302, such as one or more conventional microprocessors (e.g., one or more Intel® Pentium® processors). The processor 302 is in communication with a communication port 304 through which the processor 302 communicates with other devices (e.g., with the controller 102, with the event recording device 106 or with other devices not shown). The communication port 304 may include multiple communication channels for simultaneous communication with multiple devices. As stated, devices in communication with each other need not be continually transmitting to each other. On the contrary, such devices need only transmit to each other as necessary, may actually refrain from exchanging data most of the time, and may require several steps to be performed to establish a communication link between the devices.

The processor 302 also is in communication with a data storage device 306. The data storage device 306 may comprise an appropriate combination of magnetic, optical and/or semiconductor memory, and may include, for example, Random Access Memory (RAM), Read-Only Memory (ROM), a compact disc and/or a hard disk. The processor 302 and the data storage device 306 each may be, for example, located entirely within a single computer or other computing device; or connected to each other by a communication medium, such as a serial port cable, a telephone line or a radio frequency transceiver. Alternatively, the gaming device 104*a* may comprise one or more computers that are connected to a remote server computer (not shown) for maintaining databases.

The data storage device 306 may store, for example, a program 308 (e.g., computer program code and/or a computer program product) adapted to direct the processor 302 in accordance with the present invention, and particularly in accordance with the processes described in detail hereinafter with regard to the gaming devices 104*a-n*. In one or more embodiments wherein all or part of the functionality of the controller 102 (FIG. 2) is implemented by the gaming device 104*a*, the gaming device 104*a* may include one or more databases similar to the databases 210-214 described previously with reference to FIG. 2. For convenience, the same reference numerals for these databases are employed in FIGS. 2 and 3. Specifically, the data storage device 306 may store (i) the outcome database 210 adapted to store information that may be utilized to determine a game result (e.g., win/lose, etc.), an associated outcome value and/or associated audio/video programming for the gaming device 104*a*; and (ii) the probability database 212 adapted to store information that may be used to establish frequencies with which various outcome values will occur at the gaming device 104*a*. Though not shown in FIG. 3, the data storage device 306 also may include the session status database 214 adapted to store information that may be employed to determine whether certain historical audio/video programming may be provided to a player of the gaming device 104*a* during game play at the gaming device 104*a*. Note that when the session status database 214 is employed by a gaming device 104*a-n*, the session status database 214 typically will contain information relating only to the respective gaming device 104*a-n* (unlike the session status database 214 described below with reference to FIG. 8 which contains information relating to several gaming devices).

One or more of the databases 210-214 may be eliminated if the corresponding functionality is provided by the controller 102. Exemplary embodiments of the databases 210-214 are described below with reference to FIGS. 4B-5 and 8.

The program 308 may be stored, for example, in a compressed, an uncompiled and/or an encrypted format, and may include computer program code that allows the gaming device 104*a* to:

1. determine an outcome value of a game result at the gaming device 104*a* (e.g., based on a random number generated by the gaming device 104*a*);
2. retrieve historical audio/video programming having content that provides an indication of the outcome value of the game result; and/or
3. provide the historical audio/video programming to a player of the gaming device 104*a*.

Suitable computer program code may be provided for performing numerous other functions such as receiving historical audio/video programming, analyzing content of historical audio/video programming, determining an outcome value of a game result of the gaming device that is indicatable by the content of the audio/video programming, storing the outcome value such that the outcome value is correlated to at least a pointer to the historical audio/video programming, receiving payment in exchange for game play and/or the provision of historical audio/video programming, providing a payout if a player wins, receiving a selection of a classification of historical audio/video programming from a player of the gaming device, providing historical audio/video programming that is included within the selected classification to the player, etc.

The computer program code required to implement the above functions (and the other functions described herein) can be developed by a person of ordinary skill in the art, and is not described in detail herein. The program 308 also may include program elements such as an operating system, a database management system and "device drivers" that allow the processor 302 to interface with computer peripheral devices (e.g., a video display, a keyboard, a computer mouse, etc.).

Note that instructions of the program 308 may be read into a main memory (not shown) of the processor 302 from a computer-readable medium other than the data storage device 306, such as from a ROM or from a RAM. While execution of sequences of instructions in the program 308 causes the processor 302 to perform the process steps described herein, hard-wired circuitry may be used in place of, or in combination with, software instructions for implementation of the processes of the present invention. Thus, embodiments of the present invention are not limited to any specific combination of hardware and software.

The processor 302 also may be in communication with a clock (not shown) that supplies time and date information to the processor 302 and that may comprise, for example, a clock internal to the processor 302, a clock external to the processor 302 or a clock embodied within the program 308 (e.g., based on a system clock not shown).

The gaming device 104*a* may include any additional components required to implement the above functionality. For example, the gaming device 104*a* may include one or more input devices 310 such as a microphone, a touch screen, a keyboard or keypad, voice recognition software/hardware, an optical or magnetic read head, a card reader, a coin accepter and/or a paper currency validator, a bar code reader (e.g., for discerning value from "cashless" gaming vouchers), a game play initiator such as a button or handle, a biometric device for determining an identity or age of a player, a credit or debit card authorization terminal, etc.

The gaming device 104*a* also may include one or more output devices 312 for outputting appropriate audio/video programming and game play results to a player of the gaming device 104*a*, audio/video programming classification selections, etc. For example, the gaming device 104*a* may comprise one or more speakers, a cathode ray tube or flat panel display, a projector, etc. Note that the controller 102 may include similar input or output devices.

In one or more embodiments of the invention, the gaming device 104*a* also may include a random or pseudo-random number generator 314 that may be utilized by the gaming device 104*a* and/or the controller 102 for determining a game result (e.g., after game play has been initiated at the gaming device 104*a*). The random number generator 314 also may be employed to determine a corresponding outcome value/payout (and/or corresponding historical audio/video programming) to be provided to a player of the gaming device 104*a* as described further below. The random number generator 314 may be embodied in hardware, software or a combination thereof as is known in the art, and may include one or more features that prevent or identify tampering.

To assist in payouts as a result of winning game results at the gaming device 104*a*, the gaming device 104*a* may include a hopper controller 316 and a hopper 318. The hopper controller 316 may be configured to instruct the hopper 318 when to dispense payment, and how much payment to dispense, to a player as a result of a winning game result at the gaming device 104*a*. Hopper and hopper controllers are well known in the casino gaming device arts and will not be described in further detail herein.

In one or more embodiments of the invention, an additional memory or data storage unit 320 may be provided, for example, to serve as an intermediate storage location for audio/video programming being provided to the gaming device 104*a* from a remote source (e.g., the controller 102, the event recording device 106 or another location). As stated, the gaming devices 104*b-n* may be configured similarly to the gaming device 104*a* of FIG. 3.

In a particularly contemplated embodiment, the gaming device 104 may be a mobile terminal such as a cellular telephone, a personal digital assistant (PDA), a pager, a laptop computer or the like. The mobile terminal may be equipped with a web browser and operate as a client device to a server (e.g., online casino website, on-premises casino server for mobile gaming, etc.). Alternatively, the mobile terminal may interoperate with a second gaming device 104, portal device, or the controller 102 to allow gaming on the mobile terminal. In a first embodiment, the mobile terminal acts as a client device for the device controlled by the gaming establishment. In a second embodiment, the mobile terminal downloads software necessary and sufficient to run the game on the mobile terminal. Variations of these embodiments are also within the scope of the present invention.

Exemplary Databases for the Controller and/or Gaming Devices

Samples of the contents of the outcome database 210 and the probability database 212 are illustrated in FIGS. 4A-B and 5, respectively. Samples of the contents of the session status database 214 are described further below with reference to FIG. 8. The specific data and fields illustrated in these figures represent only one embodiment of the records that may be stored in the databases of the invention. The data and fields of these databases, as well as the number of databases, can be readily modified, for example, to include more or fewer data fields. A single database also may be employed. Note that in the databases of the controller 102 and/or the gaming devices 104*a-n*, a different reference numeral is employed to identify each field of each database. However, in at least one embodiment of the invention, fields that are similarly named (e.g., game results fields, outcome value fields, etc., described below) store similar or the same data in a similar or in the same data format.

FIG. 4A illustrates a sample of the contents of a first embodiment of the outcome database 210 of FIG. 2 or 3 (referred to as outcome database 210' in FIG. 4A for convenience). As shown in FIG. 4A, the outcome database 210' contains information related to the historical audio/video programming, game result and outcome value associated with each unique random number that may be generated by the random number generator 314 of a gaming device 104*a-n*. In the exemplary embodiment of FIG. 4A, the illustrated data within the outcome database 210' is based on outcome values traditionally associated with a three-reel, 22-stop slot machine. Typically, such a slot machine will have 22×22×22=10,648 possible unique random numbers. Accordingly, the outcome database 210' includes records corresponding to 10,648 possible random numbers (referred to as records 402*a-n* in FIG. 4A). It will be understood that other random number sizes and/or game machine configurations may be employed.

With reference to FIG. 4A, and as stated above, the 10,648 possible random numbers are identified in records 402*a-n*, respectively. Specifically, the outcome database 210' contains records having fields corresponding to, for example, (1) a random number 404; (2) audio/video programming or "output" 406; (3) a game result 408; and (4) an outcome value 410. Such fields will be referred to as a random number field, an audio/video programming field, a game result field and an outcome value field, respectively. Other outcome information also may be stored in the outcome database 210'.

The random number field of each record 402*a-n* may store data (e.g., a random number 404) representing a unique random number that may be generated by the random number generator 314 of a gaming device 104*a-n*. In general, the random number field may store any unique identifier for a random number (e.g., a numeric, alpha-numeric or other code). As will be described below, the controller 102 and/or one or more of the gaming devices 104*a-n* may use random numbers 404 to access historical audio/video programming to be provided to a gaming device player, as well as game results and outcome values for the gaming device player.

The audio/video programming field of a record 402*a-n* may store data (e.g., audio/video output 406) that may be used by the controller 102 and/or one or more of the gaming devices 104*a-n* to provide historical audio/video programming to a gaming device player. For example, the audio/video programming field of one or more of the records 402*a-n* may store an executable audio/video programming file such as an MPEG2, MPEG, AVI, MOV, WAV or other similar file as is known in the art. Alternatively, the audio/video programming field of one or more of the records 402*a-n* may include a pointer to remotely stored historical audio/video programming. For example, if the outcome database 210' is located within one of the gaming devices 104*a-n*, an audio/video programming field may contain a pointer to a historical audio/video programming file stored within the controller 102 (or within the event recording device 106 coupled to the controller 102). Further, an audio/video programming field may contain a pointer to a historical audio/video programming file stored at any other location (e.g., in a file stored at a World Wide Web address, the event recording device 106 or other location).

The game result field of each record 402*a-n* may store data (e.g., a game result 408) representing a game result associated with the random number (identified by random number 404) of the record. That is, when a random number is generated by a gaming device 104*a-n* during game play, the controller 102 and/or the gaming device 104*a-n* may determine a game result for the game play by examining data stored within the game result field of the record 402*a-n* having a random number 404 that matches the random number generated by the gaming device 104*a-n*. For example, in the exemplary outcome database 210' of FIG. 4A, the game result "WIN" (e.g., the game result 408 of record 402*a*) is associated with the random number 00001 (e.g., the random number 404 of record 402*a*). Accordingly, when the random number generator 314 (FIG. 3) of one of the gaming devices 104*a-n* generates a random number having a value of 00001, the controller 102 and/or the corresponding gaming device 104*a-n* may associate a winning game result with the random number. This random number and/or game result, in turn, may be employed by the controller 102 and/or the gaming device 104*a-n* to determine an outcome value and/or a payout (or no payout as the case may be) for a gaming device player (as described further below).

The outcome value field of each record 402*a-n* may store data (e.g., an outcome value 410) representing an outcome value associated with the random number (identified by random number 404) of the record. That is, when a random number is generated by a gaming device 104*a-n* during game play, the controller 102 and/or the gaming device 104*a-n* may determine an outcome value of a game result for the game play by examining data stored within the outcome value field of the record 402*a-n* having a random number 404 that matches the random number generated by the gaming device 104*a-n*. For example, in the exemplary outcome database 210' of FIG. 4A, an outcome value of "100" (e.g., the outcome value 410 of record 402*a*) is associated with the random number 00001 (e.g., the random number 404 of record 402*a*), as is the game result "WIN" as described previously. Accordingly, when the random number generator 314 (FIG. 3) of one of the gaming devices 104*a-n* generates a random number having a value of 00001, the controller 102 and/or the corresponding gaming device 104*a-n* may associate a winning game result having an outcome value of "100" with the random number. This outcome value, in turn, may be employed by the controller 102 and/or the gaming device 104*a-n* to determine a payment for a gaming device player (as described further below).

The outcome database 210' may be populated with data provided to the controller 102 and/or one or more of the gaming devices 104*a-n* by an operator, owner or manufacturer of the controller 102 and/or the gaming devices 104*a-n*, or by any other relevant party. Such data population may occur, for example, via the communication port 204 of the controller 102 or via the communication port 304 of a gaming device 104*a-n*.

FIG. 4B illustrates a sample of the contents of a second embodiment of the outcome database 210 of FIG. 2 or 3 (referred to as outcome database 210" in FIG. 4B for convenience). As will be described further below, use of the outcome database 210" may allow the controller 102 and/or a gaming device 104*a-n* to ensure that particular instances of historical audio/video programming are not repeatedly output to a gaming device player should the player repeatedly achieve the same outcome value during game play, or to otherwise control historical audio/video programming output frequency.

As shown in FIG. 4B, the outcome database 210" contains information related to the audio/video programming, game result and outcome value associated with unique ranges of random numbers (for random numbers that may be generated by the random number generator 314 of a gaming device 104*a-n*). In the particular embodiment shown, a plurality of audio/video programming selections or audio/video programs may be associated with each number range. Such an approach may be contrasted with the outcome database 210' of FIG. 4A which contains information related to a single audio/video program, game result and outcome value associated with each unique random number that may be generated by the random number generator 314 of a gaming devices 104*a-n*. (Note in other embodiments of the invention, multiple audio/video programs may be associated with each unique random number.)

As with the outcome database 210' of FIG. 4A, the illustrated data within the outcome database 210" is based on outcome values traditionally associated with a three-reel, 22-stop slot machine. Typically, such a slot machine will have 22×22×22=10,648 possible unique random numbers. Accordingly, the outcome database 210" includes records corresponding to ranges of numbers (or a number) that cover 10,648 possible random numbers (referred to as records 412-428 in FIG. 4B). It will be understood that other random number sizes or ranges and/or game machine configurations may be employed.

With reference to FIG. 4B, and as stated above, the random number ranges are identified in records 412-428, respectively. Specifically, the outcome database 210" contains records having fields corresponding to, for example, (1) a random number range 430; (2) a game result 432; (3) an outcome value 434; (4) audio/video programming or outputs 436*a-n*; and (5) audio/video programming statuses 438*a-n*. Such fields will be referred to as a random number range field, a game result field, an outcome value field, audio/video programming fields and audio/video programming status fields, respectively. Other outcome information also may be stored in the outcome database 210".

The random number range field of each record 412-428 may store data (e.g., a random number range 430) representing a range of numbers (or a number) associated with a game result (identified by a game result 432) of a respective game result field and an outcome value (identified by an outcome value 434) of a respective outcome value field of the record. For example, the random number range 1-8570 (e.g., the random number range 430 of record 412) may be associated with a game result of "LOSS" (e.g., the game result 432 of record 412) and an outcome value of 0 (e.g., the outcome value 434 of record 412). Accordingly, when the random number generator 314 (FIG. 3) of a gaming device 104*a-n* generates a random number in the range of 1-8570, the controller 102 and/or the corresponding gaming device 104*a-n* may associate the game result "LOSS" and an outcome value of 0 with the random number. (The outcome value, in turn, may be employed by the controller 102 and/or the gaming device 104*a-n* to determine a payout for a gaming device player, as described further below).

In general, the random number range field may store any unique identifier for a random number range (e.g., a numeric, alpha-numeric or other code). As will be described below, the controller 102 and/or one or more of the gaming devices 104*a-n* may use random number ranges 430 to access historical audio/video programming to be provided to a gaming device player, as well as game results and outcome values for the gaming device player (as described previously).

The audio/video programming fields of a record 412-428 may store data (e.g., audio/video outputs 436*a-n*) that may be used by the controller 102 and/or one or more of the gaming devices 104*a-n* to provide historical audio/video programming to a gaming device player (e.g., to provide an indication of the outcome value of the corresponding record). For example, the audio/video programming fields of one or more of the records 412-428 may store executable audio/video programming files such as MPEG2, MPEG, AVI, MOV, WAV or other similar files as is known in the art. Alternatively, the audio/video programming fields of one or more of the records 412-428 may include pointers to remotely stored historical audio/video programming. For example, if the outcome database 210" is located within one of the gaming devices 104*a-n*, an audio/video programming fields may contain pointers to historical audio/video programming files stored within the controller 102 (or within the event recording device 106 coupled to the controller 102). Further, an audio/video programming field may contain a pointer to a historical audio/video programming file stored at any other location (e.g., in a file stored at a World Wide Web address, the event recording device 106 or other location).

The audio/video programming status fields of each record 412-428 may store data (e.g., audio/video programming statuses 438*a-n*) that each indicate a status of respective audio/video programming (identified by a respective audio/video programming or output 436*a-n*). For example, an audio/video programming status field may indicate whether a particular audio/video programming file, episode, program or the like is to be provided to a gaming device player (e.g., to indicate a particular outcome value to which the player has become entitled to during game play). In one embodiment of the invention, an audio/video programming status field initially may have a status of "YES" (indicating that the audio/video programming corresponding to the status field is to be or may be provided to a gaming device player). However, following provision of the audio/video programming to the gaming device player, the audio/video programming status field may be changed to "NO" (indicating that the audio/video programming is not to be provided to the gaming device player again). The controller 102 and/or a gaming device 104*a-n* may perform such a status-change operation. Other similar flags for the audio/video programming status fields of the records 402-418 may be employed.

In another embodiment of the invention, a player of a gaming device may select a classification of historical audio/video programming to be provided to the player during game play. In such an embodiment, the player may directly or indirectly control the status of audio/video programming (e.g., by changing the state of one or more audio/video programming status fields).

With reference to the outcome database 210" of FIG. 4B, the record 412 illustrates exemplary data for a random number range of 1-8570 (random number range 430) that may be accessed if the random number generator 314 of a gaming device 104*a-n* generates a random number that falls within this range. A random number within the range of 1-8570 results in a LOSS game result (game result 432) and an outcome value of 0 (outcome value 434). In one or more embodiments of the invention, a player of the corresponding gaming device 104*a-n* may be provided with audio/video programming that indicates the outcome value of the game result. As shown in record 412, the first audio video programming (audio/video output 436*a*) is unavailable as indicated by an audio/video programming status of NO (audio/video programming status 438*a*). However, the nth audio/video programming (audio/video output 436*n*) may be provided to the player as indicated by an audio/video programming status of YES (audio/video programming status 438*a*). Accordingly, the player may be provided at least an indication of the 0 outcome value if the controller 102 and/or the respective gaming device 104*a-n* provides audio/video programming to the player that displays a ground ball being hit to third base (audio/video output 436*n*). The actual outcome value of 0 may or may not be displayed to the player.

The outcome database 210" may be populated with data provided to the controller 102 and/or one or more of the gaming devices 104*a-n* by an operator, owner or manufacturer of the controller 102 and/or the gaming devices 104*a-n*, or by any other relevant party. Such data population may occur, for example, via the communication port 204 of the controller 102 or via the communication port 304 of a gaming device 104*a-n*. Note that in one or more embodiments of the invention, differing numbers of audio/video programming may be associated with different random number ranges (e.g., as records, such as record 428, with random number ranges that are accessed infrequently may only a require a few audio/video programming options to ensure that a gaming device player does not view the same audio/video programming repeatedly).

FIG. 5 illustrates a sample of the contents of the probability database 212 of FIG. 2 or 3. As described further below, the probability database 212 contains information that may be utilized by the controller 102 and/or one or more of the gaming devices 104*a-n* to establish frequencies with which various outcome values occur during game play.

With reference to FIG. 5, the probability database 212 contains frequency information for nine number ranges as provided in records 502-518, respectively. Specifically, the probability database 212 contains records having fields corresponding to, for example, (1) a random number range 520; (2) an outcome value 522; and (3) an expected number of hits per cycle 524. Such fields will be referred to as a random number range field, an outcome value field and an expected hits per cycle field, respectively. Other probability information also may be stored in the probability database 212.

The random number range field of each record 502-518 may store data (e.g., a random number range 520) representing a range of numbers (or a number) associated with an outcome value (identified by an outcome value 522 of a respective outcome value field of the record). For example, the random number range 1-8570 (e.g., the random number range 520 of record 502) may be associated with an outcome value of 0 (e.g., the outcome value 522 of record 502). Accordingly, when the random number generator 314 (FIG. 3) of a gaming device 104*a-n* generates a random number in the range of 1-8570, the controller 102 and/or the corresponding gaming device 104*a-n* may associate an outcome value of 0 with the random number. This outcome value, in turn, may be employed by the controller 102 and/or the gaming device 104*a-n* to determine a payout for a gaming device player, as described further below.

The expected hits per cycle field of a record 502-518 may store data (e.g., expected hits per cycle 524) that indicates the expected or average number of times a random number associated with a given outcome value will be generated by the random number generator 314 of a gaming device (FIG. 3) over a complete cycle of the gaming device. In the exemplary embodiment of FIG. 5, the data within the probability database 212 is suitable for use with a three-reel, 22-stop slot machine. Such a slot machine will have 22×22×22=10,648 possible outcomes. To operate in such an embodiment, the random number generator 314 of FIG. 3 may be adapted to generate a random number having a value between 1 and 10,648. In this manner, the random number generator 314 (FIG. 3) will only generate a number that falls within the random number ranges 520 of the probability database 212. Referring again to FIG. 5, over the course of 10,648 game plays, the expected hits per cycle 524 associated with a record 502-518 specifies an expected or average number of times a random number associated with a given outcome value will be generated by the random number generator 314 (FIG. 3) during a complete cycle of the gaming device. It will be understood that other number ranges, outcome values, expected hits per cycle and/or slot machine arrangements (e.g., other numbers of reels and/or stops per reel) may be employed.

The probability database 212 may be populated with data provided to the controller 102 and/or one or more of the gaming devices 104*a-n* by an operator, owner or manufacturer of the controller 102 and/or gaming devices 104*a-n*, or by any other relevant party. Such data population may occur, for example, via the communication port 204 of the controller 102 or via the communication port 304 of a gaming device 104*a-n*.

First Exemplary Operation of the Gaming Device Control System

Figure 6:
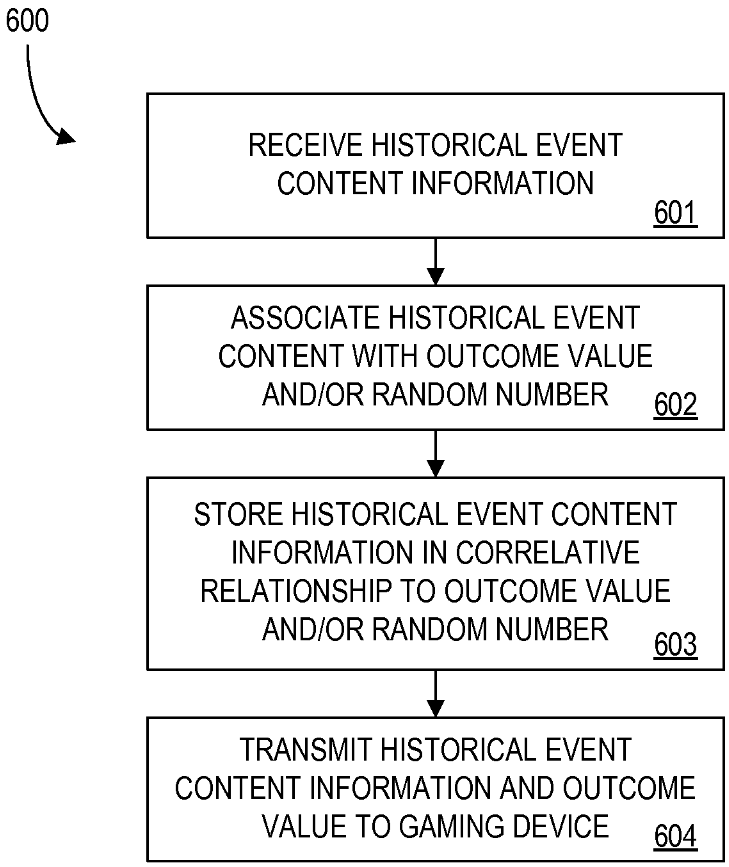
FIG. 6 illustrates a flow chart of a first exemplary process of the gaming device control system of FIGS. 1-5 useful in describing the general operation of the gaming device control system.

FIG. 6 illustrates a flow chart of a first exemplary process 600 of the gaming device control system 100 of FIGS. 1-5 useful in describing the general operation of the gaming device control system 100. One or more of the steps of the process 600 may be embodied within computer program code of the program 208 of the controller 102 and/or the program 308 of one or more of the gaming devices 104*a-n*. The above-mentioned computer program code may be embodied in one or more computer program products.

With reference to FIG. 6, the process 600 begins in step 601 in which historical audio/video programming or other similar historical event content information is received by the controller 102 and/or one or more of the gaming devices 104*a-n*. In at least one embodiment of the invention, the audio/video programming may be stored locally at the controller 102 and/or one or more of the gaming devices 104*a-n* (e.g., within the data storage device 206 of the controller 102, the memory 320 or data storage device 306 of a gaming device 104*a-n*, etc.). Alternatively, a pointer to audio/video programming may be received and/or stored by the controller 102 and/or one or more of the gaming devices 104*a-n* (e.g., a WORLD WIDE WEB or other similar address).

Audio/video programming (or pointers to such programming) may be received from a variety of sources. For example, audio/video programming, pointers and/or other information may be provided to the gaming devices 104*a-n* via the controller 102. Further audio/video programming, pointers and/or other information may be provided to the gaming devices 104*a-n* and/or the controller 102 from a source outside of the gaming device control system 100 (e.g., from another event recording device, a casino owner or operator or other third party). In one or more embodiments of the invention, audio/video programming may be provided to the controller 102 and/or one or more of the gaming devices 104*a-n* from a portable media such as a DVD, CD-ROM, etc., from hardware such as a hard disk, dedicated server, set top box (e.g., a TiVo® unit manufactured by Phillips™), etc., from the Internet (e.g., via a download from the World Wide Web), or from any other similar source. Additionally, the controller 102 and/or one or more of the gaming devices 104*a-n* may create audio/video programming (e.g., animated audio/video programming).

In step 602, the historical audio/video programming is associated with an outcome value of a game result of a gaming device 104*a-n*. For example, the controller 102, the gaming device 104*a-n*, an operator of the controller 102 and/or gaming device 104*a-n*, etc., may examine the received historical audio/video programming and determine what, if any, outcome value may be associated with the historical audio/video programming (e.g., determine an outcome value of a game result of the gaming device 104*a-n* that may be suggested, implied, hinted at, signified, or discerned by or that is otherwise is "indicatable" by the content of the audio/video programming). For example, if the historical audio/video programming depicts a high quality of performance, a high level of achievement and/or an event of historical significance, the audio/video programming may be associated with a high outcome value (e.g., by associating the audio/video programming directly with the outcome value or with a random number or range of random numbers associated with the outcome value).

As a further example, the content of historical audio/video programming received by the controller 102 and/or a gaming device 104*a-n* may include a sporting event highlight, such as a basketball player attempting a shot. In such an embodiment, the controller 102, the gaming device 104*a-n*, a controller/operator of one or more of the same, etc., may review the audio/video programming and determine an appropriate outcome value to be associated with the audio/video programming (e.g., an outcome value that may be indicated by the audio/video programming). In one embodiment of the invention, a missed shot (e.g., basketball, hockey, soccer, etc.) depicted in audio/video programming may be associated with an outcome value of 0 or another low outcome value. Likewise, a successful shot/score may be associated with a higher outcome value. Audio/video programming with content of great historical significance or depicting a high level of performance or achievement may be associated with a very high outcome value. For example, Michael Jordan's game winning shot with 5.2 seconds remaining in game 6 of the 1997-1998 NBA finals, a hole-in-one, a perfect 10 or other flawless execution, may be associated with a jackpot or other high outcome value.

In step 603, the historical audio/video programming is stored such that the outcome value is correlated to at least a pointer to the historical audio/video programming (e.g., the audio/video programming is stored in a correlative relationship to the outcome value and/or a random number associated with the outcome value). For example, an indication of the historical audio/video programming (e.g., a file, a pointer to the file, etc.) may be stored within the outcome database 210' (FIG. 4A) or the outcome database 210" (FIG. 4B) in one of the records 402*a-n* or 412-428, respectively.

If the historical audio/video programming already resides in a gaming device 104*a-n* (e.g., if at least step 603 was performed at the gaming device 104*a-n*), then the process 600 may end at step 603. Otherwise, at step 604, the historical audio/video programming (or a pointer to the historical audio/video programming) and the associated outcome value may be transmitted to one or more gaming devices 104*a-n*. For example, the historical audio/video programming (or a pointer to the historical audio/video programming) and/or the associated outcome value may be transmitted to one or more gaming devices 104*a-n* from the controller 102, the event recording device 106 and/or any other location. Thereafter, the process 600 ends.

Second Exemplary Operation of the Gaming Device Control System

Figure 7A:
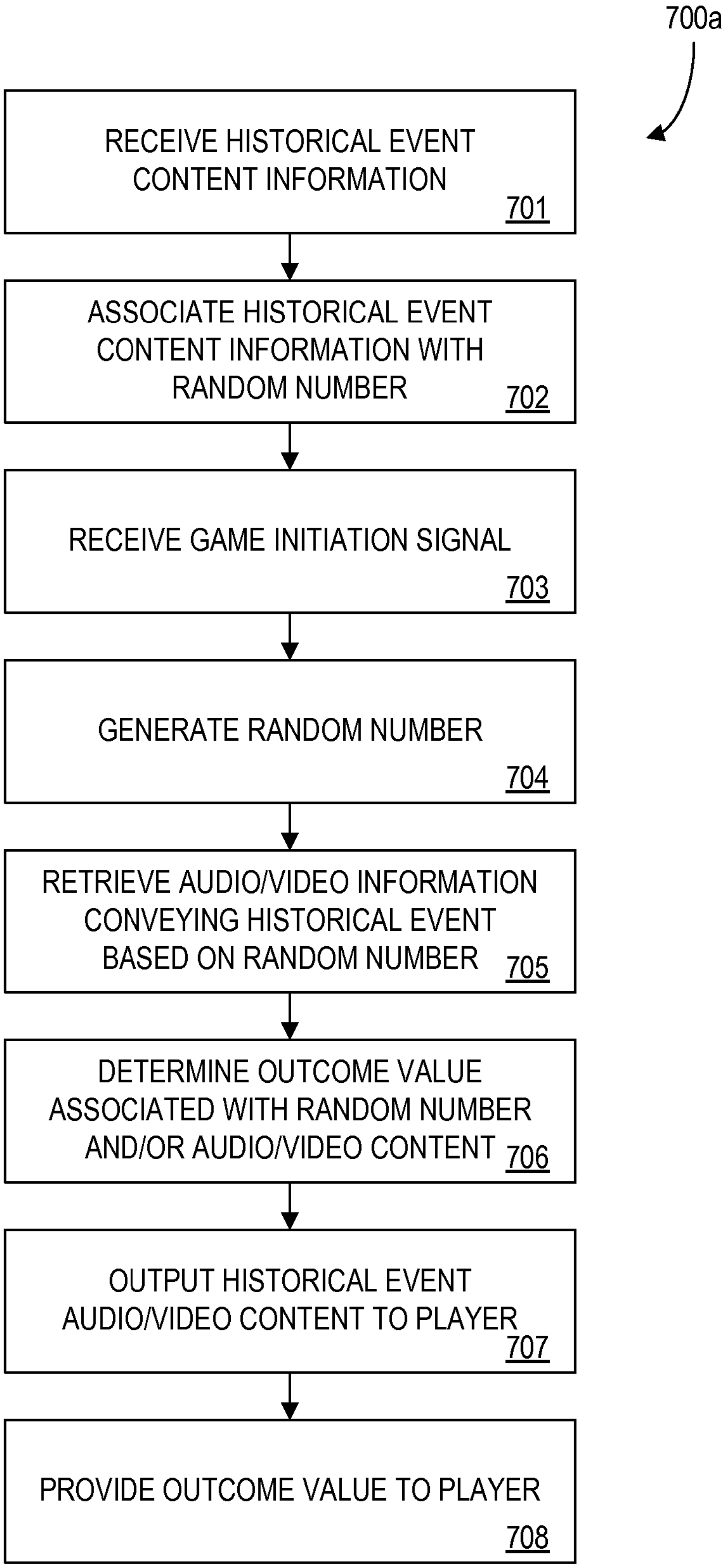
FIG. 7A illustrates a flow chart of a second exemplary process of the gaming device control system of FIGS. 1-5.

FIG. 7A illustrates a flow chart of a second exemplary process 700*a* of the gaming device control system 100 of FIGS. 1-5 useful in describing the general operation of the gaming device control system 100. One or more of the steps of the process 700*a* may be embodied within computer program code of the program 208 of the controller 102 and/or the program 308 of one or more of the gaming devices 104*a-n*. The above-mentioned computer program code may be embodied in one or more computer program products.

With reference to FIG. 7A, the process 700*a* begins in step 701 in which historical audio/video programming or other similar historical event content information is received by the controller 102 and/or one or more of the gaming devices 104*a-n*. Such a step may be similar to that of step 601 of process 600 of FIG. 6 and/or may be eliminated if the audio/video programming has already been received (e.g., and stored locally at one or more of the gaming devices 104*a-n*).

As stated, the received historical audio/video programming may be stored locally at the controller 102 and/or one or more of the gaming devices 104*a-n* (e.g., within the data storage device 206 of the controller 102, the memory 320 or data storage device 306 of a gaming device 104*a-n*, etc.). Alternatively, a pointer to audio/video programming may be received and/or stored by the controller 102 and/or one or more of the gaming devices 104*a-n* (e.g., a WORLD WIDE WEB or other similar address).

Audio/video programming (or pointers to such programming) may be received from a variety of sources. For example, audio/video programming, pointers and/or other information may be provided to the gaming devices 104*a-n* via the controller 102. Further audio/video programming, pointers and/or other information may be provided to the gaming devices 104*a-n* and/or the controller 102 from a source outside of the gaming device control system 100 (e.g., from another event recording device, a casino owner or operator or other third party). In one or more embodiments of the invention, audio/video programming may be provided to the controller 102 and/or one or more of the gaming devices 104*a-n* from a portable media such as a DVD, CD-ROM, etc., from hardware such as a hard disk, dedicated server, set top box (e.g., a TiVo® unit manufactured by Phillips™), etc., from the Internet (e.g., via a download from the World Wide Web), or from any other similar source. Additionally, the controller 102 and/or one or more of the gaming devices 104*a-n* may create audio/video programming (e.g., animated audio/video programming).

In step 702, the historical audio/video programming is associated with an outcome value of a game result of a gaming device 104*a-n*. Again, such a step may be similar to that of step 602 of process 600 of FIG. 6 and/or may be eliminated if the audio/video programming has already been associated with an outcome value. In one exemplary embodiment, a gaming device 104*a-n* may associate received historical audio/video programming and a corresponding outcome value with a random number or a range of random numbers (e.g., based on information stored within the probability database 212 (FIG. 5) of the controller 102 and/or the gaming device 104*a-n*). In another embodiment, the controller 102 may associate random numbers and/or random number ranges with historical audio/video programming and a corresponding outcome value, and such information may be transmitted to and stored locally at one or more gaming devices 104*a-n* (or retrieved from the controller 102 by one or more gaming devices 104*a-n*). In general, more than one random number, random number range and/or outcome value may be associated with a particular historical audio/video programming content.

In step 703, a game initiation signal is received by a gaming device 104*a-n*. The game initiation signal may comprise, for example, an indication of a wager by a gaming device player, actuation of a button, handle or lever, etc. In one or more embodiments, a gaming device 104*a-n* may receive a game initiation signal via the input device 310 or the communication port 304 (e.g., from the controller 102 or some other source).

In step 704, the controller 102 and/or a gaming device 104*a-n* may initiate game play at the respective gaming device 104*a-n* (e.g., in response to the game initiation signal). For example, the controller 102 and/or the respective gaming device 104*a-n* (e.g., via computer program code) may instruct the random number generator 314 of the gaming device to generate a random number. In one or more embodiments of the invention, the controller 102 may initiate game play at a gaming device by transmitting a game initiation signal to the gaming device (e.g., via the communication port 204 of the controller 102). In an alternate embodiment of the invention, a gaming device player may be directed/required to initiate game play at a gaming device in response to a game initiation signal.

In steps 705 and 706, based on the random number generated by a gaming device 104*a-n* in step 704, the controller 102 and/or the gaming device 104*a-n* may determine historical audio/video programming and an outcome value for a game result of the initiated game play. For example, the controller 102 and/or the gaming device 104*a-n* may access the game result field, the audio/video programming field and the outcome value field of the record 402*a-n* of the outcome database 210' (FIG. 4A) having a random number 404 that matches the random number generated in step 704; and determine a game result, audio/video programming and an outcome value based on the contents of the game result field, the audio/video programming field and the outcome value field of the record. Likewise, the controller 102 and/or the gaming device 104*a-n* may access the game result field, the audio/video programming fields and the outcome value field of the record 412-418 of the outcome database 210" (FIG. 4B) having a random number range 430 that includes the random number generated in step 704; and determine a game result, audio/video programming and an outcome value based on the contents of the game result field, the audio/video programming fields and the outcome value field of the record. Note that more than one audio/video programming selection may be available if the outcome database 210" of FIG. 4B is employed (e.g., depending on the various audio/video programming field statuses of the respective record). Note that steps 705 and 706 may be performed in any order.

In step 707, the historical audio/video programming retrieved at step 705 is provided (e.g., output or otherwise displayed) to the gaming device player. For example, the controller 102 and/or a gaming device 104*a-n* may execute a file containing audio/video programming and stored within the outcome database 210' of FIG. 4A or the outcome database 210" of FIG. 4B (e.g., an MPEG2, MPEG, AVI, MOV, WAV or other similar file), and output audio/video content via an appropriate device (e.g., the output device 312 of one of the gaming devices 104*a-n*). Alternatively, the controller 102 and/or a gaming device 104*a-n* may host or output programming received from another source (e.g., a gaming device 104*a-n* may host/output programming received from the controller 102, the controller 102 and/or a gaming device 104*a-n* may host/output programming received from a remote location such as from a dedicated server, the Internet or the event recording device 106).

In step 708, any payout due to the gaming device player (based on the game result and/or outcome value of the game play initiated at step 703 and/or 704) is provided to the gaming device player. For example, the controller 102 and/or the respective gaming device 104*a-n* may access the outcome value field of the appropriate record 402*a-n* of the outcome database 210' or the outcome value field of the appropriate record 412-428 of the outcome database 210" to determine the payout due to the gaming device player. In one or more embodiments, the payout the gaming device player is to receive may be equal to or based on the outcome value achieved by the gaming device player during game play. In at least one embodiment of the invention, the controller 102 and/or a gaming device 104*a-n* may direct the hopper 318 (via the corresponding hopper controller 316) to dispense a predetermined payout to the gaming device player. The payout may be cash deposited to a coin tray of a gaming device, posted to an account associated with the gaming device player (e.g., as a credit), a voucher or printed receipt that includes a bar code that may be subsequently validated/redeemed, etc. Following step 708, the process 700*a* of FIG. 7A ends.

Third Exemplary Operation of the Gaming Device Control System

Figure 7B:
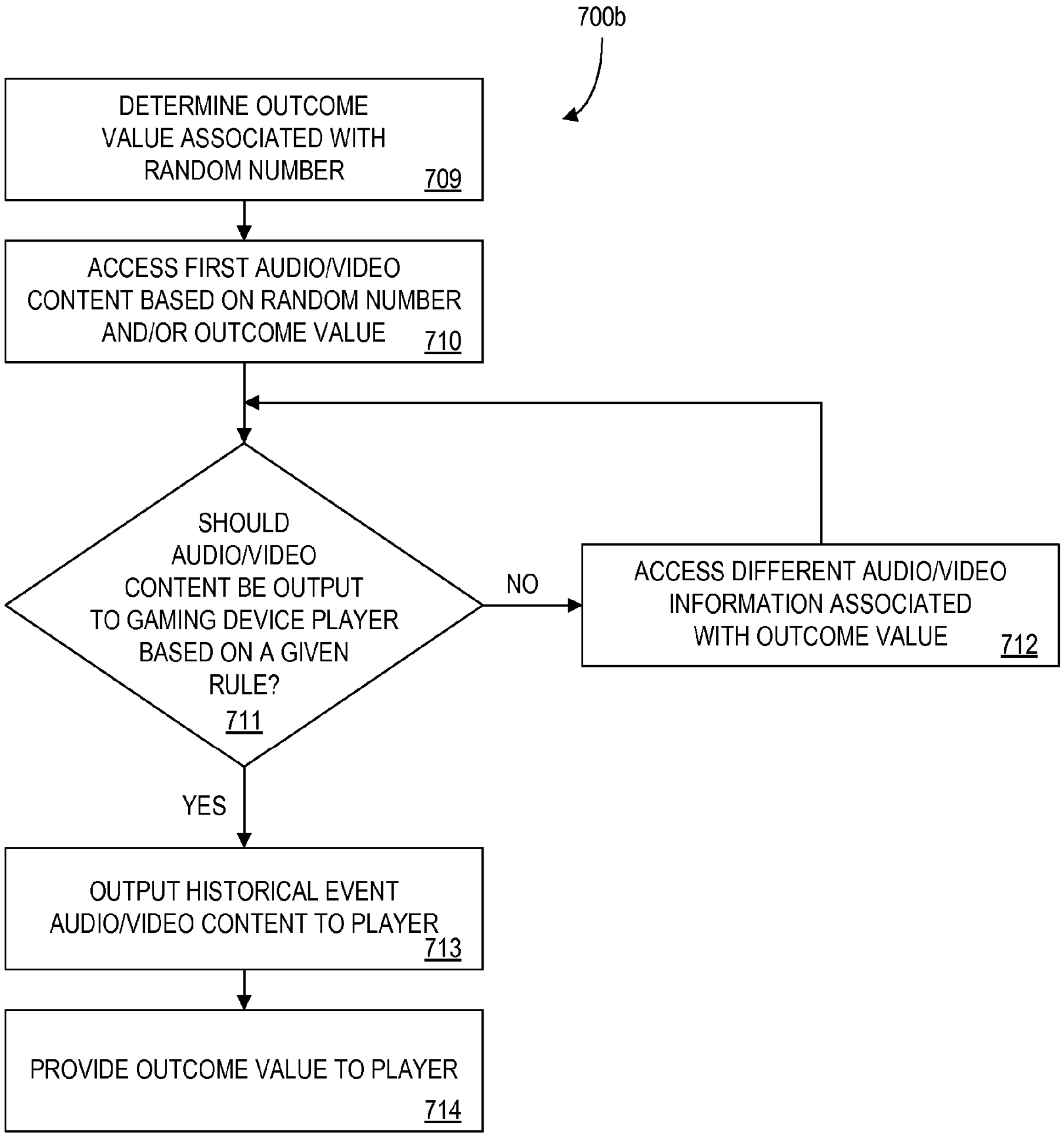
FIG. 7B illustrates a flow chart of a third exemplary process of the gaming device control system of FIGS. 1-5.

FIG. 7B illustrates a flow chart of a third exemplary process 700*b* of the gaming device control system 100 of FIGS. 1-5 useful in describing the general operation of the gaming device control system 100. More specifically, FIG. 7B illustrates a process for controlling which historical audio/video programming is provided to a gaming device player during game play (e.g., to prevent the same historical audio/video programming from being replayed repeatedly if the gaming device player achieves the same outcome value repeatedly, or to otherwise control audio/video programming presentation). One or more of the steps of the process 700*b* may be embodied within computer program code of the program 208 of the controller 102 and/or the program 308 of one or more of the gaming devices 104*a-n*. The above-mentioned computer program code may be embodied in one or more computer program products.

The process 700*b* may be performed following game initiation at a gaming device 104*a-n* (such as after step 703 in FIG. 7A). With reference to FIG. 7B, the process 700*b* begins in step 709 wherein, based on the random number generated by a gaming device 104*a-n* (e.g., in response to a game initiation signal), the controller 102 and/or the gaming device 104*a-n* determines an outcome value for a game result of game play initiated at the gaming device 104*a-n*. In one or more embodiments of the invention, the controller 102 and/or the gaming device 104*a-n* may access the outcome value field of the record 412-418 of the outcome database 210" (FIG. 4B) having a random number range 430 that includes the random number generated by the respective gaming device 104*a-n*; and determine an outcome value based on the content of the outcome value field of the record. The random number thus serves as an index that may be employed to access a record of the outcome database 210". A corresponding game result also may be determined. Note that random numbers rather than random number ranges may be employed to access outcome values (and/or game results) as described previously with reference to the outcome database 210' of FIG. 4A.

In step 710, based on the random number employed to retrieve the outcome value in step 709, the controller 102 and/or the respective gaming device 104*a-n* may determine or otherwise access first historical audio/video programming. For example, the controller 102 and/or the gaming device 104*a-n* may access the first audio/video programming field of the record 412-418 of the outcome database 210" (FIG. 4B) having a random number range 430 that includes the random number generated by the respective gaming device 104*a-n*, and determine the first historical audio/video programming based on the content of the first audio/video programming field of the record. The outcome value alternatively may be employed as an index into the appropriate record, and/or random numbers rather than random number ranges may be employed to access audio/video programming.

In step 711, a determination is made (e.g., by the controller 102 and/or the respective gaming device 104*a-n*) whether the first audio/video programming should be provided to the gaming device player. For example, the controller 102 and/or the respective gaming device 104*a-n* may examine the audio/video programming status field (FIG. 4B) corresponding the first audio/video programming (e.g., the first audio/video programming status field of the record 412-428 that includes or points to the first audio/video programming determined/accessed in step 710). Based on the current state of the status field, the controller 102 and/or the respective gaming device 104*a-n* may determine whether the first audio/video programming should be provided to the gaming device player.

As stated, there may be instances in which it may be undesirable to provide particular audio/video programming content to a gaming device player. For example, if the gaming device player repeatedly achieves the same outcome value during game play, the gaming device player may not wish to view the same audio/video programming over-and-over again. Accordingly, in one or more embodiments of the invention, more than one audio/video programming selection may be associated with an outcome value, and the controller 102, one or more of the gaming devices 104*a-n*, a gaming device player or any other relevant party may determine, for example, how often (if ever) audio/video programming may repeat during game play. Such an approach may provide the controller 102 and/or the gaming devices 104*a-n* with increased flexibility with regard to programming content to be output to a gaming device player.

If it is determined in step 711 that the first audio/video programming should not be provided to the gaming device player (e.g., based on the first audio/video programming status field of the corresponding record of the outcome database 210"), in step 712, the controller 102 and/or the respective gaming device 104*a-n* may determine or otherwise access different audio/video programming for the gaming device player. Step 711 then may be repeated to determine if the newly accessed audio/video programming should be provided to the gaming device player (as described above). Steps 711 and 712 may be repeated until audio/video programming been accessed that may be provided to the gaming device player.

Once historical audio/video programming has been found that may be provided to the gaming device player, the process 700*b* proceeds to step 713. In step 713, the historical audio/video programming is provided (e.g., output or otherwise displayed) to the gaming device player. For example, the controller 102 and/or a gaming device 104*a-n* may execute a file containing audio/video programming as described previously with reference to step 707 of FIG. 7A (e.g., an MPEG2, MPEG, AVI, MOV, WAV or other similar file stored, for example, in the outcome database 210"), and output audio/video content via an appropriate device (e.g., the output device 312 of the gaming device 104*a-n*). Alternatively, the controller 102 and/or a gaming device 104*a-n* may host or output programming received from another source (e.g., a gaming device 104*a-n* may host/output programming received from the controller 102, the controller 102 and/or a gaming device 104*a-n* may host/output programming received from a remote location such as from a dedicated server, the Internet or the event recording device 106).

In step 714, any payout due to the gaming device player is provided to the gaming device player. For example, the controller 102 and/or the respective gaming device 104*a-n* may access the outcome value field of the appropriate record 412-428 of the outcome database 210" to determine the payout due to the gaming device player. In one or more embodiments of the invention, the payout the gaming device player is to receive may be equal to or based on the outcome value achieved by the gaming device player during game play. In at least one embodiment of the invention, the controller 102 and/or a gaming device 104*a-n* may direct the hopper 318 (via the corresponding hopper controller 316) to dispense a predetermined payout to the gaming device player. The payout may be cash deposited to a coin tray of a gaming device, posted to an account associated with the gaming device player (e.g., as a credit), a voucher or printed receipt that includes a bar code that may be subsequently validated/redeemed, etc. Following step 714, the process 700*b* of FIG. 7B ends.

Exemplary Embodiment of the Session Status Database

FIG. 8 illustrates a sample of the contents of the session status database 214 of the controller 102 of FIG. 2. As stated, one or more of the gaming devices 104*a-n* may be similarly configured to employ a session status database.

With reference to FIG. 8, the session status database 214 includes data relevant to various gaming sessions being conducted and/or that have been conducted at one or more of the gaming devices 104*a-n*. As will be described further below, the controller 102 may employ the session status database to determine whether or not certain historical audio/video programming should be made available to a gaming device player during a session of game play at a gaming device (e.g., whether an audio/video programming status field associated with audio/video programming should be "flagged" to allow or prevent provision of the audio/video programming to a gaming device player as described previously with reference to the outcome database 210" of FIG. 4B). A similar session status database may be employed by one or more of the gaming devices 104*a-n* to regulate/control audio/video programming that is provided to a gaming device player during game play.

As shown in FIG. 8, the session status database 214 contains information related to five gaming device players (e.g., engaged in gaming sessions at five different gaming devices being monitored and/or controlled by the controller 102). The five gaming device players are identified in records 802-810, respectively. Specifically, the session status database 214 contains records having fields corresponding to, for example, (1) a player identifier 812; (2) a gaming device identifier 814; (3) a session start date/time 816; (4) a number of handle pulls 818; and (5) audio/video programming or output information 820*a-n*. Such fields will be referred to as a player identifier field, a gaming device identifier field, a start date/time field, a number of handle pulls field and audio/video programming information fields, respectively. Other player/gaming session information also may be stored in the session status database 212.

The player identifier field of each record 802-810 may store data (e.g., a player identifier 812) representing a unique identifier (e.g., a numeric, alpha-numeric or other code) for a player of a gaming device, such as one of the gaming devices 104*a-n*. The information stored in the player identifier field may be derived, for example, from a player tracking card at a gaming device, may be provided by the player, or may be obtained by any other method.

The gaming device identifier field of a record 802-810 may store a generalized textual, graphical or other description (e.g., a gaming device identifier 814) for a gaming device being employed by a player identified by a respective player identifier 812 of the record. Thus, a gaming device identifier field may be employed by the controller 102 (and/or a gaming device 104*a-n*) to identify the gaming device being employed by a gaming device player.

The session start date/time field of a record 802-810 may store date and/or time information that identifies when a gaming device player (identified by the player identifier 812 of the record) began a gaming session, game play or other activity at a gaming device (identified by the gaming device identifier 814 of the record). In one or more embodiments of the invention, information stored in the session start date/time field of a record 802-810 may be employed by the controller 102 and/or a gaming device 104*a*-*n* to determine the availability of certain historical audio/video programming to a gaming device player. For example, an audio/video programming status field (FIG. 4B) associated with audio/video programming may be periodically updated or reset to allow previously displayed and/or disabled audio/video programming to be provided to a gaming device player during a gaming session (e.g., even though the same audio/video programming has already been provided to the gaming device player during the gaming session).

The number of handle pulls field of a record 802-810 may store information that identifies the number of times game play has been initiated by a gaming device player (identified by the player identifier 812 of the record) of a gaming device (identified by the gaming device identifier 814 of the record). In one or more embodiments of the invention, information stored in the number of handle pulls field of a record 802-810 may be employed by the controller 102 and/or a gaming device 104*a*-*n* to determine the availability of certain historical audio/video programming to a gaming device player. For example, an audio/video programming status field (FIG. 4B) associated with audio/video programming may be updated or reset to allow previously displayed and/or disabled audio/video programming to be provided to a gaming device player during a gaming session if the gaming device player has performed a predetermined number of handle pulls (e.g., even though the same audio/video programming has already been provided to the gaming device player during the gaming session). For non-handle initiated games, other parameters may be similarly employed for controlling/affecting audio/video programming availability (e.g., a number of times a game initiation button has been pressed).

The audio/video programming information fields of a record 802-810 may store information (e.g., audio/video programming information 820*a*-820*n*) that describes and/or identifies instances of audio/video programming that have been output to a gaming device player identified by the player identifier 812 of the record (e.g., in accordance with the present invention so as to indicate an outcome value of a game result of game play at a gaming device identified by the gaming device identifier 814 of the record). In one or more embodiments of the invention, information stored in the audio/video programming information fields of a record 802-810 may be employed by the controller 102 and/or a gaming device 104*a*-*n* during the selection of audio/video programming from a plurality of audio/video programming selections that are associated with an outcome value. For example, the controller 102 and/or a gaming device 104*a*-*n* may examine the audio/video programming information fields (audio/video programming information 820*a*-820*n*) to determine if a particular audio/video programming selection has been previously provided to a gaming device player (e.g., a particular audio/video programming selection accessed, for example, during step 710 or step 712 of the process 700*b* of FIG. 7B).

The session status database 214 may be populated with data provided to the controller 102 and/or one or more of the gaming devices 104*a*-*n* by an operator, owner or manufacturer of the controller 102 and/or the gaming devices 104*a*-*n*, or by any other relevant party. Such data population may occur, for example, via the communication port 204 of the controller 102 or via the communication port 304 of a gaming device 104*a*-*n*.

With reference to the session status database 214 of FIG. 8, the record 802 illustrates exemplary data for a gaming device player P 161 (player identifier 812) that is participating in a gaming session at gaming device M 601 (gaming device identifier 814). The player P 161 began game play activity at the gaming device M 601 on Jan. 1, 2005 at 1:55 pm (session start date/time 816), and has initiated game play 86 times (number of handle pulls 818). In response to the 86 game plays, the player P 161 has been provided a plurality of audio/video programs (audio/video programming information 820*a*-820*n*).

Embodiments of the present invention thus provide methods, apparatus, systems, computer program products and the like for employing audio/video programming to indicate an outcome value of game play at a gaming device such as a slot machine, video poker machine, etc. For example, the invention may be employed to display an outcome value to a gaming device player, based on pre-established payouts and/or probabilities associated with a gaming device (e.g., a slot machine), in the form of historical audio/video programming (e.g., audio/video information representative of a historical event). As described, such historical audio/video programming may include, for example, content that depicts a professional athlete executing a golf shot, a football play (e.g., a kick return), a baseball event (e.g., a single pitch/hit in a home run derby) or similar physical contest, an actor or actress performing in a soap opera or situational comedy scene, etc., an animated movie or feature, or any other similar audio/video programming embodied in a digital, an analog or another format. As a further example, where historical audio/video programming depicts an acting scene, content such as outtakes, bloopers, poorly-acted scenes and/or scenes having little significance to an overall establishment of a plot may be associated with reduced outcome values. Likewise, content that depicts well-acted scenes or scenes of greater significance or impact to an overall establishment of a plot may be associated with greater outcome values.

As described above, the present invention may be implemented via a random number determination process (e.g., employing a random number as an index to historical audio/video programming), so as to be compatible with the majority of existing casino gaming devices. In one particular embodiment of the invention, the historical audio/video programming to be output to a gaming device player may be representative of one or more golfers executing golf shots during a golf tournament. Such an embodiment is advantageous in that a large number of audio/video programming selections may be recorded, created or otherwise captured during a typical golf tournament. For example, a four-day golf tournament including a field of 72 golfers and having an average per-round score of par 72 may yield in excess of 20,000 historical audio/video selections (e.g., 72×72×4=20,736 golf strokes that may be recorded and employed to indicate outcome values of game results). Each golf stroke may be reviewed, interpreted and correlated to an outcome value of a gaming machine, and used to indicate an outcome value to a gaming device player. For example, a hole-in-one may be associated with a top jackpot, while a missed short putt or errant shot may be associated with an outcome value of 0.

The use of golf-related audio/video programming in accordance with the present invention is also advantageous in that certain probabilities associated with the game of golf closely resemble probabilities associated with slot machines. For example, the known general odds of a professional golfer executing a hole-in-one on a given par 3 tee shot are approximately the same as the known odds of a slot machine player achieving a top jackpot with any given pull of an average 22-stops-per-reel, non-progressive jackpot slot machine (e.g., approximately 1 in 10,000+).

The foregoing description discloses only exemplary embodiments of the invention. Modifications of the above disclosed apparatus and methods which fall within the scope of the invention will be readily apparent to those of ordinary skill in the art. For instance, in at least one embodiment of the invention, a gaming device player may establish one or more parameters for use by the controller 102 and/or a gaming device 104*a-n* during selection of historical audio/video programming to be output to the gaming device player. As an example, the controller 102 and/or a gaming device 104*a-n* may provide a menu or list of options for a gaming device player that allows the player to select a classification of audio/video programming to receive during game play (e.g., the audio/video programming providing an indication of an outcome value of a game result). A classification of audio/video programming may include audio/video programming relating to one or more of a specific sports team (e.g., a favorite baseball team), athlete, course, stadium, field, golf hole selection, venue, actor or actress, era or time period, game (e.g., the World Series, the 1997 World Series, World Series game 7, the Superbowl, etc.).

The controller 102 and/or a gaming device 104*a-n* may employ classification information provided by a gaming device player to limit or otherwise control the content of historical audio/video programming provided to the gaming device player during game play. For example, the controller 102 and/or a gaming device 104*a-n* may store a plurality of outcome tables (e.g., within one or more of the outcome databases 210, 210, 210") each containing historical audio/video programming (or pointers to such programming) that relates to and/or is based on the classification of audio/video programming selected by a gaming device player (e.g., audio/video programming that relates only to the team, athlete, actor, etc., selected by the gaming device player). Outcome values may be associated and stored with the audio/video programming.

TABLE 1 includes a list of exemplary classifications of audio/video programming that may be provided and/or made available to a gaming device player in accordance with the present invention (e.g., and used to indicate an outcome value of a game result of game play at a gaming device 104*a-n*). The data in TABLE 1 is merely exemplary, and it will be understood that other classifications of audio/video programming may be employed. In general, such classifications may be selected by a gaming device player, the controller 102, a gaming device 104*a-n*, or any other relevant party. Further, more than one classification of audio/video programming may be provided during game play and/or a gaming session.

TABLE 1

| CLASSIFICATION OF AUDIO/VIDEO PROGRAMMING | EXEMPLARY CONTENT FOR LOW OUTCOME VALUE | EXEMPLARY CONTENT FOR HIGH OUTCOME VALUE |
|---|---|---|
| figure skating | flawed execution | Olympic gold performance |
| bowling | missed spare | perfect game |
| tennis | unforced error | match winning shot |
| hockey | shot wide | OT winning goal |
| stock car racing | side-by-side race | checkered flag |
| boxing | separating fighters | KO punch |
| wrestling | lull in action | 3-count pin |
| billiards/pool | missed shot | sunk trick shot |
| action sports | missed trick | contest winner |
| reality TV | failed | most wanted arrest |
| (e.g., Cops) | investigation | |
| TV Drama, SitCom | blooper/out take | Emmy-winning performance |
| Talk Shows | denial | reconciliation |
| Game Shows | incorrect answer | correct answer |
| Nature Shows | common domestic animal scene | rare/exotic animal scene |

In another embodiment of the invention, historical audio/video programming may form the basis of a bonus game at a gaming device 104*a-n*. For example, audio/video programming such as a scene from a situational comedy (SitCom) or other episode of programming, may be displayed to a gaming device player to indicate an outcome value of game play. Thereafter, the gaming device player may be prompted with a bonus trivia question (e.g., by the controller 102 and/or a gaming device 104*a-n*), and be entitled to an additional payout if the player answers the question correctly. Exemplary bonus questions might include the season in which the episode first aired, the name of the actor that plays the lead character, etc.

In yet another embodiment of the invention, historical audio/video programming may be output to a gaming device player (e.g., by the controller 102 and/or a gaming device 104*a-n*) in a manner that provides commonality or continuity during game play (e.g., from one presentation of audio/video programming to the next during a gaming session). For example, if audio/video programming to be presented to a gaming device player is to be based on a golf classification in which a golfer executes golf shots on an 18-hole golf course, the controller 102 and/or a gaming device 104*a-n* may provide audio/video programming associated with the first golf hole of the golf course during the beginning portion of a gaming session, and may provide audio/video programming associated with subsequent golf holes thereafter (e.g., sequentially so that the game player "progresses" through the 18-hole golf course during game play at the gaming device 104*a-n*). The session status database 214 (FIG. 2) may be employed to provide information regarding session start times and other relevant information to assist in such an embodiment.

In a further embodiment of the invention, audio/video programming to be output to a gaming device player during game play may be provided to the controller 102 and/or a gaming device 104*a-n* by a gaming device player (e.g., using the event recording device 106, the World Wide Web or via any other method). For example, the gaming device player may "pre-register" audio/video programming with the controller 102 and/or a gaming device 104*a-n* (e.g., for subsequent use when outcome values are indicated by the provision of audio/video programming to the player).

In yet another embodiment of the invention, the process by which historical audio/video programming is selected for output to a gaming device player may be displayed to the player. For instance, a gaming device 104*a-n* may display a plurality of small windows, each depicting a first scene of different audio/video programming that may be output to the gaming device player (e.g., to indicate one or more outcome values). In a particular embodiment, the gaming device player, the controller 102 and/or a gaming device 104*a-n* may select any one of the audio/video programming options for output to the gaming device player.

In accordance with yet another embodiment of the invention, the provision of historical audio/video information to the gaming device player may entail providing multiple instances of audio video programming relating to a single determination of an outcome value. For example, in accordance with an embodiment where the audio/video programming depicts golfers executing golf shots, the provision of audio/video programming may entail providing three separate audio/video clips (e.g. each of a threesome's tee shots). The outcome value may be determined by or indicated to the player should each of the clips convey successful execution and/or a common result (e.g. all three players reach the green in regulation).

Figure 9:
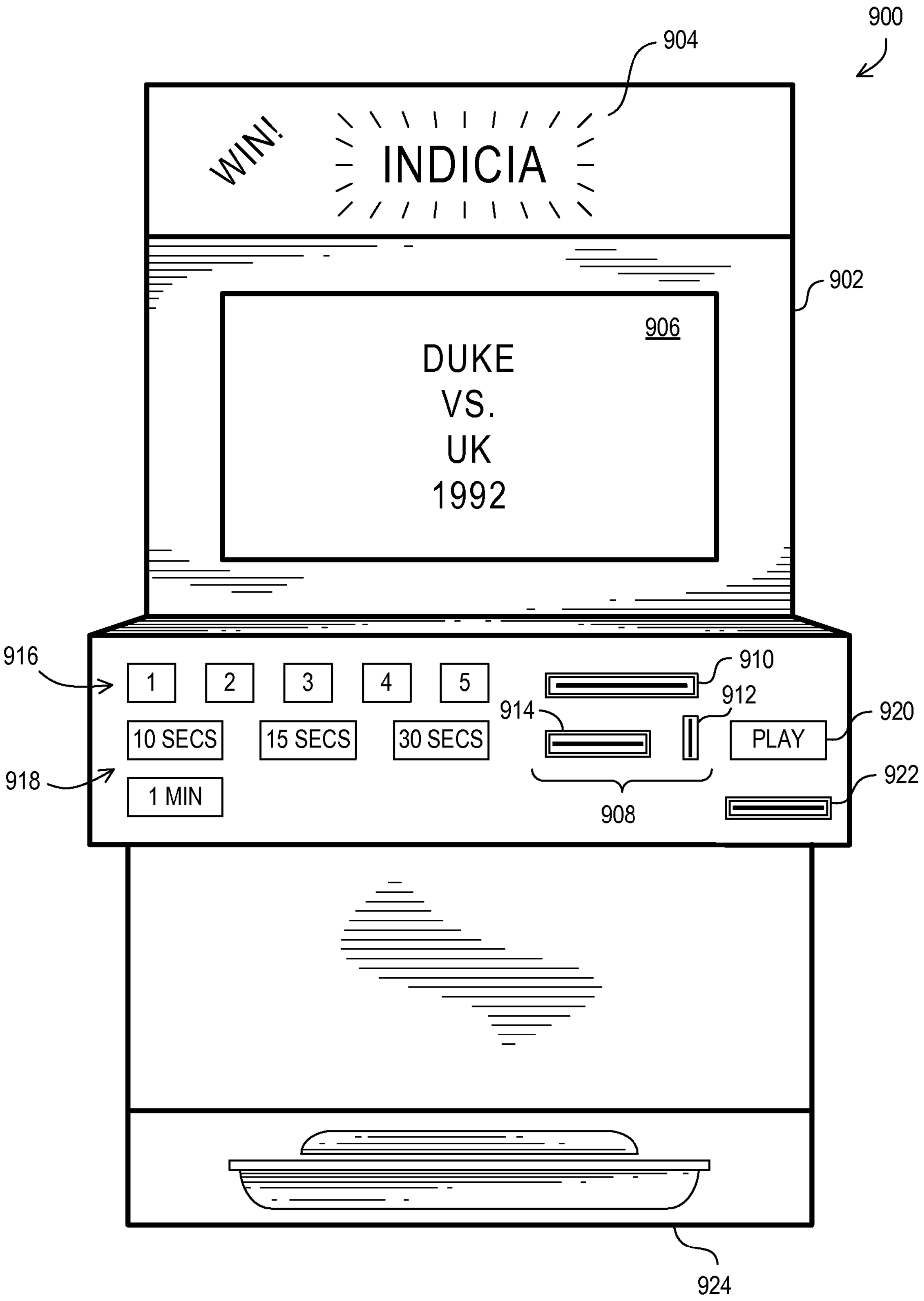
FIG. 9 illustrates an exemplary embodiment of a gaming device suitable for use with some embodiments of the present invention.

FIG. 9 illustrates an exemplary gaming device 900 suitable for use with some embodiments of the present invention. The gaming device 900 may have a controller, memory, software, and databases in a manner similar to the gaming devices 104 described herein. However, the gaming device 900 has a series of elements adapted to facilitate embodiments of the present invention. In particular, the gaming device includes a housing 902 with indicia 904 displayed thereon. The indicia 904 may be related to the nature or context of the audio/visual programming available on the gaming device 900. The housing 902 also includes a display 906, which may be a touch screen, CRT, LED, LCD, plasma or other display as is well understood. Images made by audio/visual programming clips may be presented to players on the display 906.

The gaming device 900 also has a series of player inputs including a payment acceptance mechanism 908 including a bill or cashless receipt acceptor 910, a coin acceptor 912 and/or a magnetic card reader 914. While not specifically shown, a player tracking mechanism may also be present. Such a player tracking mechanism may be a card reader, a dongle port, an RFID interrogator, or the like as needed or desired.

The gaming device 900 has further inputs in the form of wager buttons 916, which represent a plurality of wager options. While illustrated as wagers of "1-2-3-4-5" coins, it should be appreciated, that the precise nature may be varied. For example, an "add coin to wager" and "max wager" button could be used. Thus, a player could press the "add coin to wager" one time to wager one coin, two times to wager two coins, three times to wager three coins, four times to wager four coins, etc. depending on the nature of the maximum wager. Further, touch-screen icons representative of such buttons may alternately or additionally be utilized.

The gaming device 900 further includes a number of time limit selection buttons 918 which allow the player to select durations (or approximate durations) for audio/visual programming clips presented to the player to inform the player of the outcome. In an exemplary embodiment, a plurality of buttons 918 are provided with time indicia such as ten seconds, fifteen seconds, thirty seconds, and one minute. By depressing one of the buttons 918, the player provides an indication to the gaming device 900 as to how long the clips displayed to the player should last. Clips of shorter or longer duration are eliminated from the list of possible clips to present to the player and the databases may be modified accordingly so that only clips of the appropriate length are considered when determining the outcome and the clip to play. Note that in an exemplary embodiment, requesting longer clips forecloses some wager options. That is, in exchange for showing longer clips, the gaming device 900 may require higher wagers so that the wager per time unit remains at an acceptable level. One exemplary manner in which this may be effectuated is after depressing a time limit selection button 918, only certain of the wager buttons 916 are illuminated. If a player depresses a non-illuminated button 916, a message may appear on display 906 indicating that the wager chosen is inappropriate for the time length selected. Alternatively, no message is displayed, but the game is not further enabled until the player makes a correct wager. In another embodiment, the player is free to select wagers and clip length without limitation. Once the wager and time limit are set, play is initiated by pressing a play button 920. Note that some or all of the buttons 916, 918, and 920 may be incorporated into the display 906 if the display 906 is a touch screen or the like.

The gaming device 900 may also include output devices such as a receipt printer 922 which may print cashless receipts or other printed matter and a coin try 924 from which coins or tokens may be dispensed as is well understood.

In practice, a player establishes equity in the gaming device 900, such as by inserting bills or coins into bill acceptor 910 or coin acceptor 912. The player then selects a wager by pressing a wager button 916, selects a clip time length by pressing a time limit selection button 918 and presses play button 920. The controller (not shown) of the gaming device 900 determines an outcome, such as through a technique previously described, and plays the audio/visual programming clip associated with the outcome. To prevent subjecting the player to the same clip for comparable outcomes, an algorithm may be employed to determine if the clip has previously been presented, and if so, an alternate clip of equivalent value presented. The player views the clip and infers an outcome amount therefrom. Subsequently or concurrently, the player may be informed of an actual value associated with the outcome. For example, the golfer may hit the shot and as it dribbles to a spot close to the pin on the green, the player is informed that the payout for this birdie is twenty coins.

In an alternate embodiment, suspense is added to the process by showing a montage of very brief images from amongst all the audio/visual programming clips in rapid succession before playing a single clip. This montage could be a series of still images or short sequences of frames of clips or the like as needed or desired. As an alternative to the montage, a series of images in a simulated "fast-forward" or spinning mode may be displayed. That is, the image may move up or down adding to the sense of motion created by the changing images. In effect, the montage or flashing images simulate a more traditional reeled slot machine's spinning of the reels. The player may understand the "shuffling" of various such images before clip playback as a visual representation of randomness involved in the selection of the particular clip about to be played back. The player's suspense is increased as the player awaits the beginning of the playback of the actual outcome representative clip.

Figure 10:
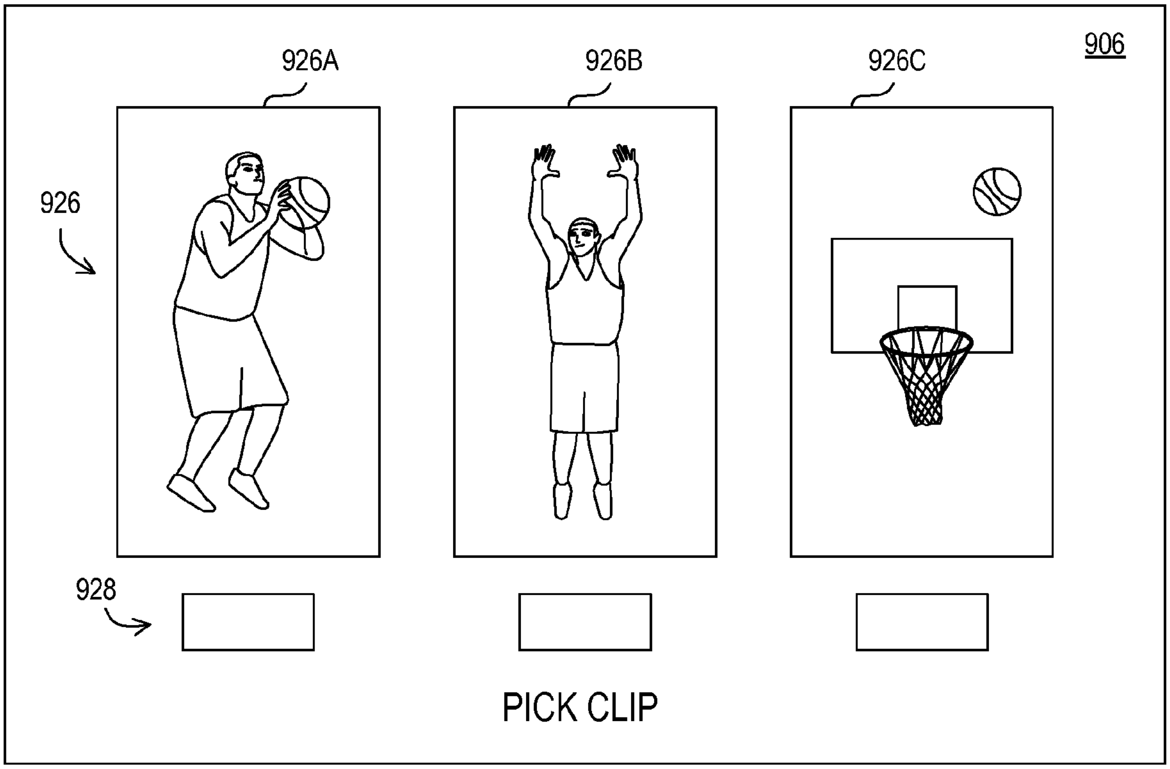
FIG. 10 illustrates a screen shot of a selection option available to players in some embodiments of the present invention.

In still another embodiment discussed above, the gaming device 900 (or other gaming device described herein) may allow the player to select from between a plurality of still images each representing different audio/visual programming clips (e.g., a first still image represents a first clip, a second still image represents a second clip, etc.). An exemplary screen shot is provided in FIG. 10. Thus, a controller determines an outcome and selects a plurality of audio/visual programming clips corresponding to that outcome. For example, a low value outcome may be associated with one hundred clips. The controller selects three of the one hundred clips and presents a still image or frame 926 from each clip on the display 906. For example, first frame 926A shows a player about to shoot a free throw; second frame 926B shows a player defending a player before a drive to the basket; and third frame 926C shows a ball flying toward a basket. Each frame 926 has a selection button 928 associated therewith and the display 906 has instructions for the player to select a clip by pressing a selection button 928. Note that while three frames 926 are shown, a different number could be used if needed or desired. Note that this embodiment also allows for variations in the presentation of the outcome to the player. For example, the frames 926 could be conceptualized as reels with different images therein. Then, when the player presses the play button 920, these reels could "spin" showing a spinning collection of images of different frames from different (or the same) clips much like reels on a slot machine. Then, as these reels "settle" or resolve, a single frame 926 is displayed for each reel and the player selects from amongst the displayed frames 926 as previously described.

In a first embodiment, it does not particularly matter which button 928 the player selects, because the value of each of the clips associated with the respective frames 926 is the same. However, perhaps one clip features a favorite personality or team for the player and the player selects based on this preference. Such selection gives the player a feeling of additional control over the game while not materially affecting game play.

In a second embodiment, the value of the outcome may be affected by the player's selection. That is, the controller selects a plurality of possible outcomes and presents a frame 926 for each of the plurality of possible outcomes. The player's selection then impacts not only which clip is played, but also the benefit provided. For example, in a basketball themed game, a low value outcome may have a free throw shot associated therewith (frame 926A); a thunderous shot-block may be a medium value outcome (frame 926B), and a game ending missed shot may be a zero value outcome (frame 928C). When the player is presented with the three frames, the player's choice determines the value of the outcome. Note that values may be duplicated if needed or desired. For example, frame s 926A and 926C may correspond to losing outcomes and frame 926B correspond to a three coin outcome. Variations on the valuation are thus within the scope of the present invention.

Figure 11:
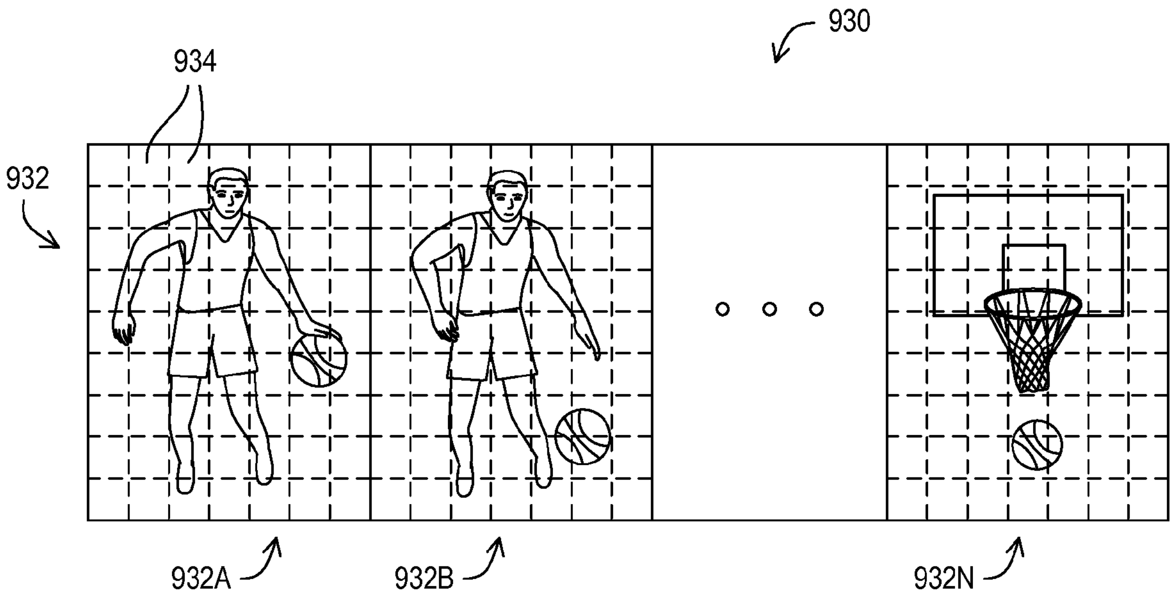
FIG. 11 illustrates an exemplary embodiment of parsing images for use in an alternate screen shot.

To combat possible perfect knowledge on the part of the player (e.g., if historical clips from NBA basketball games are utilized, an avid fan or well-studied player may perhaps be able to discern how valuable certain clips might be should they be selected), the frame 926 may be modified to only show a portion of a still image shown by frame 926. FIG. 11 provides an illustration of what is intended. In particular, each audio/visual programming clip 930 may be formed from a plurality of frames 932A-932N (collectively frames 932). Each frame 932 may be divided into a plurality of subportions 934. In place of displaying a full frame 926, a subportion 934 may be displayed. For example, a hemline on a pair of shorts may be displayed, or a shot of the court, a cloud in the sky, or the like. These subportions 934 may be stored as separate jpeg or other appropriate picture file format files or created as needed. Note that while illustrated as being of uniform size, the subportions 934 need not be so divided. Likewise, it is readily apparent that the number of subportions 934 may rapidly be increased by descreasing the size to the point where it becomes difficult for a human player to ascertain which subportions 934 belong to which clips 930. As still another tool in the arsenal to defeat the expert player or perfect knowledge problem, a time limit could be imposed such that it would be difficult to query an external source to determine which subportions belong to which clips.

As a variation on this concept, the controller of the gaming device 900 could move through the subportions of a frame sequentially such as by indexing each subportion and keeping track of which suportions have been presented, incrementing a counter each time. Alternatively, the subportion may be selected randomly from amongst the various subportions within the clip.

Accordingly, while the present invention has been disclosed in connection with exemplary embodiments thereof, it should be understood that other embodiments may fall within the spirit and scope of the invention as defined by the following claims.

What is claimed is:

1. A method of operating a gaming system including a memory device which stores a plurality of instructions, the method comprising:

(a) enabling a player to place a wager on a play of a game at a gaming device of the gaming system; and (b) for the play of the game:

(i) after the placement of the wager and regardless of any monetary amount provided by the player, enabling the player to select one of a plurality of different audio/visual programming clip time lengths;

(ii) causing a processor to execute the plurality of instructions to randomly determine an outcome in association with the play of the game;

(iii) causing the processor to execute the plurality of instructions to determine an audio/visual programming clip to display based on the player selected clip time length and the randomly determined outcome; and (iv) causing a display device to display said determined audio/visual programming clip.

2. The method of claim 1, wherein enabling the player to place the wager includes receiving input from the player through a button.

3. The method of claim 2, wherein receiving input from the player through the button includes receiving input from the player through a touch screen button.

4. The method of claim 1, wherein enabling the player to select the time length for the audio/visual programming clip includes receiving input from the player through a button.

5. The method of claim 4, wherein receiving input from the player through the button includes receiving input from the player through a touch screen button.

6. The method of claim 1, wherein displaying the audio/visual programming clip includes displaying an audio/visual programming clip repurposed from its original purpose into a gaming environment.

7. The method of claim 1, wherein displaying the audio/visual programming clip includes presenting an audio/visual programming clip of a human performance.

8. The method of claim 1, wherein enabling the player to place the wager on the play of the game at the gaming device includes enabling the player to place a wager on a mobile terminal.

9. The method of claim 1, wherein enabling the player to place the wager on the play of the game at the gaming device includes enabling the player to place a wager on a server based gaming device.

10. A gaming system comprising:

a display device;

a processor;

a user interface; and a controller operatively coupled to the display device, the processor and the user interface and configured to:

(a) enable a player to place a wager on a play of a game; and (b) for the play of the game:

(i) after the placement of the wager and regardless of any monetary amount provided by the player, enable the player to select one of a plurality of different audio/visual programming clip time lengths;

(ii) randomly determine an outcome in association with the play of the game;

(iii) determine an audio/visual programming clip to display based on the selected clip time length and the randomly determined outcome; and (iv) display said determined audio/visual programming clip.

11. The system of claim 10, wherein the user interface is embodied in a mobile terminal.

12. The system of claim 10, wherein the controller is remotely positioned from the user interface.

13. A non-transitory computer readable medium comprising software with instructions, which when executed by a processor, cause the processor to:

(a) enable a player to place a wager on a play of a game at a gaming device; and (b) for the play of the game:

(i) after the placement of the wager and regardless of any monetary amount provided by the player, enable the player to select one of a plurality of different audio/visual programming clip time lengths;

(ii) randomly determine an outcome in association with the play of the game;

(iii) determine an audio/visual programming clip to display based on the player selected clip time length and the randomly determined outcome; and (iv) cause a display device to display said determined audio/visual programming clip.

14. A method of operating a gaming system including a memory device which stores a plurality of instructions, the method comprising:

(a) enabling a player to place a wager on a play of a game at a gaming device of the gaming system; and (b) for the play of the game:

(i) after the placement of the wager and regardless of any monetary amount provided by the player, enabling the player to select one of a plurality of different audio/visual programming clip time lengths;

(ii) causing a processor to execute the plurality of instructions to randomly determine an outcome for the play of the game;

(iii) causing the processor to execute the plurality of instructions to randomly determine a plurality of audio/visual programming clips based on the player a selected clip time length and the randomly determined outcome;

(iv) causing a display device to display a plurality of frames to the player, the plurality of frames corresponding to the determined plurality of audio/visual programming clips;

(v) enabling the player to select at least one of the plurality of frames; and (vi) causing the display device to display the audio/visual programming clip corresponding to the at least one selected frame.

15. The method of claim 14, wherein the audio/visual programming clips include one or more recordings of a human performance.

16. The method of claim 14, wherein displaying a plurality of frames to the player further includes displaying a plurality of images in a manner to simulate spinning reels before stopping on the frames.

17. A gaming system comprising:

a display device;

a processor;

a user interface; and a controller operatively coupled to display device, the processor and the user interface and configured to:

(a) enable a player to place a wager on a play of a game; and (b) for the play of the game:

(i) after the placement of the wager and regardless of any monetary amount provided by the player, enable the player to select one of a plurality of different audio/visual programming clip time lengths;

(ii) determine an outcome for the play of the game;

(iii) randomly determine a plurality of audio/visual programming clips based on the player selected clip time length and the randomly determined outcome;

(iv) display a plurality of frames to the player, the plurality of frames corresponding to the determined plurality of audio/visual programming clips;

(v) enable the player to select at least one of the plurality of frames; and (vi) display the audio/visual programming clip corresponding to the at least one selected frame.

18. A non-transitory computer readable medium comprising software with instructions, which when executed by a processor, cause the processor to:

(a) enable a player to place a wager on a play of a game at a gaming device; and (b) for the play of the game:

(i) after the placement of the wager and regardless of any monetary amount provided by the player, enable the player to select one of a plurality of different audio/visual programming clip time lengths;

(ii) randomly determine an outcome for the play of the game;

(iii) determine a plurality of audio/visual programming clips based on the player selected clip time length and the randomly determined outcome;

(iv) cause a display device to display a plurality of frames to the player, the plurality of frames corresponding to the determined plurality of audio/visual programming clips;

(v) enable the player to select at least one of the plurality of frames; and (vi) cause the display device to display the audio/visual programming clip corresponding to the at least one selected frame.

19. A method of operating a gaming system including a memory device which stores a plurality of instructions, the method comprising:

(a) enabling a player to place a wager on a play of a game at a gaming device of the gaming system; and (b) for the play of the game:

(i) after the placement of the wager and regardless of any monetary amount provided by the player, enabling the player to select one of a plurality of different audio/visual programming clip time lengths;

(ii) causing a processor to execute the plurality of instructions to determine a plurality of audio/visual programming clips based on the pplayer selected clip time length;

(iii) causing a display device to display a plurality of images to the player, the plurality of images comprising subportions of frames of the plurality of determined audio/visual programming clips, and the plurality of images being associated with a plurality of different outcomes;

(iv) enabling the player to select at least one of the plurality of images;

(v) causing the display device to display the audio/visual programming clip corresponding to the at least one selected image; and (vi) display the outcome associated with the displayed audio/visual programming clip.

20. The method of claim 19, further including providing a benefit to the player corresponding to the selection of the at least one image.

21. The method of claim 19, further including randomly selecting subportions from the determined audio/visual programming clips to display to the player.

22. The method of claim 19, further including sequentially selecting subportions from the determined audio/visual programming clips to display to the player.

23. A system comprising:

a display device;

a processor;

a user interface; and a controller operatively coupled to the display device, the processor and the user interface and configured to:

(a) enable a player to place a wager on a play of a game; and (b) for the play of the game:

(i) after the placement of the wager and regardless of any monetary amount provided by the player, enable the player to select one of a plurality of different audio/visual programming clip time lengths;

(ii) determine a plurality of audio/visual programming clips based on the player selected clip time length;

(iii) display a plurality of images to the player, the plurality of images comprising subportions of frames of the determined plurality of audio/visual programming clips, and the plurality of images being associated with a plurality of different outcomes;

(iv) enabling the player to select at least one of the plurality of images;

(v) display the audio/visual programming clip corresponding to the at least one selected image; and (vi) display the outcome associated with the displayed audio/visual programming clip.

24. A non-transitory computer readable medium comprising software with instructions, which when executed by a processor, cause the processor to:

(a) enable a player to place a wager on a play of a game; and (b) for the play of the game:

(i) after the placement of the wager and regardless of any monetary amount provided by the player, enable the player to select one of a plurality of different audio/visual programming clip time lengths;

(ii) determine a plurality of audio/visual programming clips based on the player selected clip time length;

(iii) display a plurality of images to the player, the plurality of images comprising subportions of frames of the determined audio/visual programming clips, and the plurality of images being associated with a plurality of different outcomes;

(iv) enable the player to select at least one of the plurality of images;

(v) display the audio/visual programming clip corresponding to the at least one selected image; and (vi) display the outcome associated with the displayed audio/visual programming clip.

* * * * *